(12) United States Patent
Kitaji

(10) Patent No.: US 8,233,806 B2
(45) Date of Patent: Jul. 31, 2012

(54) TRANSMITTER APPARATUS AND COMMUNICATION SYSTEM

(75) Inventor: Mitsuhiro Kitaji, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 680 days.

(21) Appl. No.: 12/065,073

(22) PCT Filed: Aug. 15, 2006

(86) PCT No.: PCT/JP2006/316056
§ 371 (c)(1),
(2), (4) Date: Jul. 20, 2009

(87) PCT Pub. No.: WO2007/026538
PCT Pub. Date: Mar. 8, 2007

(65) Prior Publication Data
US 2009/0269073 A1    Oct. 29, 2009

(30) Foreign Application Priority Data
Aug. 31, 2005 (JP) .................... 2005-252821

(51) Int. Cl.
*H04B 10/00* (2006.01)
(52) U.S. Cl. .................. 398/172; 398/118; 398/131
(58) Field of Classification Search .......... 398/118–131, 398/172
See application file for complete search history.

(56) References Cited

U.S. PATENT DOCUMENTS

| | | | | |
|---|---|---|---|---|
| 4,727,600 A * | 2/1988 | Avakian | | 398/126 |
| 5,020,155 A * | 5/1991 | Griffin et al. | | 398/130 |
| 5,027,433 A * | 6/1991 | Menadier et al. | | 398/129 |
| 5,416,627 A * | 5/1995 | Wilmoth | | 398/129 |
| 5,424,859 A * | 6/1995 | Uehara et al. | | 398/127 |
| 5,526,161 A * | 6/1996 | Suzuki et al. | | 398/118 |
| 5,528,391 A * | 6/1996 | Elrod | | 349/1 |
| 5,539,393 A * | 7/1996 | Barfod | | 340/10.6 |
| 5,635,915 A * | 6/1997 | Gray | | 340/9.1 |
| 5,657,145 A * | 8/1997 | Smith | | 398/172 |
| 5,724,168 A * | 3/1998 | Oschmann et al. | | 398/127 |
| 5,757,528 A * | 5/1998 | Bradley et al. | | 398/129 |
| 5,909,296 A * | 6/1999 | Tsacoyeanes | | 398/129 |
| 5,986,790 A * | 11/1999 | Ota et al. | | 398/1 |
| 6,008,923 A * | 12/1999 | Samdahl et al. | | 398/127 |
| 6,166,496 A * | 12/2000 | Lys et al. | | 315/316 |
| 6,400,482 B1 * | 6/2002 | Lupton et al. | | 398/140 |
| 6,614,126 B1 * | 9/2003 | Mitchell | | 307/9.1 |
| 6,707,389 B2 * | 3/2004 | Pederson | | 340/815.45 |
| 6,829,439 B1 * | 12/2004 | Sidorovich et al. | | 398/131 |
| 6,865,347 B2 * | 3/2005 | Perkins et al. | | 398/172 |
| 6,954,591 B2 * | 10/2005 | Lupton et al. | | 398/115 |

(Continued)

FOREIGN PATENT DOCUMENTS

JP    2001-244948    9/2001

(Continued)

*Primary Examiner* — Agustin Bello
(74) *Attorney, Agent, or Firm* — Procopio, Cory, Hargreaves & Savitch LLP

(57) ABSTRACT

A transmitter apparatus to transmit information to a receiver apparatus by using visible light emitted from a plurality of light sources includes at least a first light source to transmit user data; at least a second light source to transmit a pilot signal; and at least a third light source to transmit notice information that is necessary for receiving the user data in the receiver apparatus, the third light source being placed at a position determined by the position of the second light source.

22 Claims, 23 Drawing Sheets

U.S. PATENT DOCUMENTS

| | | | |
|---|---|---|---|
| 6,968,133 B2 * | 11/2005 | Sakanaka et al. | 398/122 |
| 7,006,768 B1 * | 2/2006 | Franklin | 398/127 |
| 7,046,160 B2 * | 5/2006 | Pederson et al. | 340/815.45 |
| 7,099,589 B1 * | 8/2006 | Hiramatsu | 398/127 |
| 7,239,811 B2 * | 7/2007 | Yamada et al. | 398/130 |
| 7,336,903 B2 * | 2/2008 | Iwamoto et al. | 398/129 |
| 7,352,972 B2 * | 4/2008 | Franklin | 398/172 |
| 7,356,261 B2 * | 4/2008 | Yamada et al. | 398/129 |
| 7,409,161 B2 * | 8/2008 | Watanabe | 398/130 |
| 7,447,442 B2 * | 11/2008 | Oda et al. | 398/172 |
| 7,496,297 B2 * | 2/2009 | Sun et al. | 398/182 |
| 7,639,951 B2 * | 12/2009 | Hirayama | 398/128 |
| 7,642,730 B2 * | 1/2010 | Dowling et al. | 315/292 |
| 2002/0131121 A1 * | 9/2002 | Jeganathan et al. | 359/152 |
| 2005/0002673 A1 * | 1/2005 | Okano et al. | 398/130 |
| 2009/0269073 A1 * | 10/2009 | Kitaji | 398/130 |

FOREIGN PATENT DOCUMENTS

| | | |
|---|---|---|
| JP | 2001-292107 | 10/2001 |
| JP | 2005-269036 | 9/2005 |
| JP | 2006-094014 | 4/2006 |
| JP | 2006-094015 | 4/2006 |
| JP | 2006-191313 | 7/2006 |

* cited by examiner

FIG. 13

| |
|---|
| NAME OF SIGNAL : REFERENCE COORDINATES |
| COORDINATE SYSTEM : POLAR COORDINATE SYSTEM |
| NUMBER OF REFERENCE PILOTS : 2 |
| PILOT 1 : (0,0) |
| PILOT 2 : (2,0) |
| CONTROL : (1,0) |

FIG. 14

| |
|---|
| NAME OF SIGNAL : VISIBLE LIGHT SOURCE |
| COORDINATE SYSTEM : POLAR COORDINATE SYSTEM |
| NUMBER OF VISIBLE LIGHT SOURCES : N |
| PILOT 1 : (0,0) |
| PILOT 2 : (2,0) |
| CONTROL : (1,0) |
| VISIBLE LIGHT SOURCE : (a,b) |
| VISIBLE LIGHT SOURCE : (c,d) |
| VISIBLE LIGHT SOURCE : (e,f) |
| VISIBLE LIGHT SOURCE : (g,h) |
| ⋮ |
| VISIBLE LIGHT SOURCE : (i,j) |

(last N rows bracketed as N)

FIG. 15

| |
|---|
| NAME OF SIGNAL: ALLOCATED LIGHT SOURCE |
| COORDINATE SYSTEM: POLAR COORDINATE SYSTEM |
| NUMBER OF ALLOCATED LIGHT SOURCES: M |
| NUMBER OF REFERENCE PILOTS: 1 |
| PILOT 1: (0,0) |
| VISIBLE LIGHT SOURCE: (k,l) |
| VISIBLE LIGHT SOURCE: (m,n) |
| VISIBLE LIGHT SOURCE: (o,p) |
| VISIBLE LIGHT SOURCE: (q,r) |
| ⋮ |
| VISIBLE LIGHT SOURCE: (s,t) |

The last M rows are grouped as M.

FIG. 19

| |
|---|
| NAME OF SIGNAL : CHANGE OF VISIBLE LIGHT SOURCES |
| COORDINATE SYSTEM : POLAR COORDINATE SYSTEM |
| NUMBER OF DELETED LIGHT SOURCES : 2 |
| NUMBER OF ADDED LIGHT SOURCES : 3 |
| PILOT 1 : (0,0) |
| DELETED LIGHT SOURCE : (k,l) |
| DELETED LIGHT SOURCE : (m,n) |
| ADDED LIGHT SOURCE : (q,r) |
| ADDED LIGHT SOURCE : (s,t) |
| ADDED LIGHT SOURCE : (u,v) |

FIG. 24

| | |
|---|---|
| AP | · PERFORM ALLOCATION OF PILOT SIGNAL, DATA LIGHT SOURCES FOR AT1 AND DATA LIGHT SOURCES FOR AT2 TO AT1 AND AT2 AND NOTIFY AT1 AND AT2 OF ALLOCATION<br>· AT THIS TIME, COMMON LIGHT SOURCE FOR PILOT SIGNAL IS USED BY AT1 AND AT2<br>· CHANGE ALLOCATION AFTER RECEIVING ACK FROM EACH AT |
| AT1 | · RECEIVE REALLOCATION INFORMATION OF PILOT LIGHT SOURCE AND DATA LIGHT SOURCES<br>· MODIFY LIGHT SOURCE MAPPING AND TRANSMIT ACK TO AP |
| AT2 | · RECEIVE REALLOCATION INFORMATION OF PILOT LIGHT SOURCE AND DATA LIGHT SOURCES<br>· MODIFY LIGHT SOURCE MAPPING AND TRANSMIT ACK TO AP<br>· NOTIFY AP OF CHANGE OF VISIBLE LIGHT SOURCES AFTER MOVEMENT |
| AP | · PERFORM ALLOCATION OF PILOT SIGNAL, DATA LIGHT SOURCES FOR AT1 AND DATA LIGHT SOURCES FOR AT2 TO AT1 AND AT2 AND NOTIFY AT1 AND AT2 OF ALLOCATION<br>· AT THIS TIME, COMMON LIGHT SOURCE FOR PILOT SIGNAL IS USED BY AT1 AND AT2<br>· CHANGE ALLOCATION AFTER RECEIVING ACK FROM EACH AT<br>· ALLOCATE PILOT SIGNAL ON THE SIDE OF MOVING DIRECTION OF AT2 AND NOTIFY AT2 OF ALLOCATION |
| AT1 | · RECEIVE REALLOCATION INFORMATION OF DATA LIGHT SOURCES<br>· MODIFY LIGHT SOURCE MAPPING AND TRANSMIT ACK TO AP |
| AT2 | · RECEIVE REALLOCATION INFORMATION OF PILOT LIGHT SOURCE AND DATA LIGHT SOURCES<br>· MODIFY LIGHT SOURCE MAPPING AND TRANSMIT ACK TO AP<br>· NOTIFY AP OF CHANGE OF VISIBLE LIGHT SOURCES AFTER MOVEMENT |

TRANSMITTER APPARATUS AND COMMUNICATION SYSTEM

CROSS-REFERENCE TO RELATED APPLICATION

This application is the U.S. national stage application of international application serial number PCT/JP2006/316056, filed 15 Aug. 2006, which claims priority to Japanese patent application no. 2005-252821, filed 31 Aug. 2005, each of which is incorporated herein by reference in its entirety.

FIELD OF THE INVENTION

The present invention relates to a transmitter apparatus including LEDs (light emitting diodes) or the like and to a communication system. Particularly, the present invention relates to a technique of performing visible-light communication and using a light source thereof as illuminating light.

BACKGROUND OF THE INVENTION

LEDs have advantages of having higher efficiency and longer life compared to fluorescent lamps, which have conventionally been used as illumination. In recent years, the LEDs have had higher brightness and have been used as a source of illuminating light for saving energy. For example, the LEDs are used as illumination for traffic signals.

Furthermore, the LEDs have a very high response speed and can be electrically controlled. By using these characteristics, studies about communication using LEDs have been performed recently. In the communication using LEDs, the LEDs can be used as illuminating light because human's eyes cannot perceive very high-speed blinking of the LEDs.

Typically, a plurality of LEDs are used as a source of illuminating light because only one LED has insufficient brightness. In communication using illuminating light, data is transmitted by OOK (on-off-keying) modulation or the like in the plurality of LEDs provided in a transmitter, and the data is received by a photodetector provided in a receiver. However, a maximum data rate obtained in this method is determined depending on the performance of the LEDs, such as a response speed, and another mechanism is required to increase the data rate.

Under these circumstances, various suggestions to increase the data rate have been made. For example, Japanese Unexamined Patent Application Publication No. 2001-292107 disclosed the following technique. That is, LEDs are arranged in a matrix pattern of (1,1) to (N,N) and serial data is converted to parallel of N×N in a transmitter. Data is received by photodiodes in a receiver, serving as photoreceivers placed in a matrix pattern, from respective elements by using a lens, so as to increase the data rate. In this case, the brightness can be increased by using a set of 100 LEDs for each matrix element. For example, assume that each element including the set of LEDs enables a data rate of 10 Mbps. In that case, if the number of elements is 4×4=16, a data rate of 160 Mbps can be realized in total.

In the above-described technique, serial data is mapped in parallel by using a predetermined placement of a light source and parallel communication is performed to increase the data rate to N times that of serial communication.

SUMMARY

Problems to be Solved by the Invention

However, the above-described related art has the following problem. That is, in the apparatus and system described in Japanese Unexamined Patent Application Publication No. 2001-292107, the transmitter transmits a parallel data after converted from a serial data, by using a plurality of LED sets. The receiver converts the received parallel data to an original serial data. At this time, a predetermined rule is required for the conversion. Because of the data conversion under the rule, the LEDs need to be placed in accordance with the predetermined rule.

The predetermined rule is as follows. For example, in the above-described 4×4 matrix placement, sorting needs to be performed in the order of (0,0), (0,1), (0,2), ... (4,3), (4,4) in the form of a 4×4 square in the parallel-to-serial conversion. In this case, low degree of freedom of design for placement of LEDs restricts the arrangement of LEDs for interior illumination significantly.

Another problem is that data can be transmitted to only one receiver at the same time because all elements of the matrix transmit parallel data.

Still another problem is that transmission and reception cannot be performed at all if any one of the elements of the matrix does not function due to the LEDs dying out.

The present invention has been completed to solve the above-described problems and an object of the present invention is to provide a transmitter apparatus and a communication system in which the degree of freedom of arrangement for a light source can be increased.

Means for Solving the Problems

According to the present invention, a transmitter apparatus to transmit information to a receiver apparatus by using visible light emitted from a plurality of light sources, comprises at least a first light source to transmit user data, at least a second light source to transmit a pilot signal, and at least a third light source to transmit notice information that is necessary for receiving the user data in the receiver apparatus. The third light source is placed at a position determined by the position of the second light source.

With this configuration, the receiver apparatus that receives the information from the first light source through the visible light can specify the third light source based on the pilot signal and can specify the first light source by obtaining the information necessary for receiving the user data based on the notice information from the third light source. Accordingly, the light sources can be freely placed in the transmitter apparatus.

In the transmitter apparatus, the notice information preferably includes information that is necessary for specifying the first light source in the receiver apparatus.

With this configuration, the receiver apparatus can specify the first light source regardless of the placement of the light sources.

In the transmitter apparatus, the notice information preferably includes information of positions of the second and third light sources.

With this configuration, the receiver apparatus can specify the position of the first light source based on a positional relationship between the second and third light sources.

In the transmitter apparatus, the notice information preferably includes information about a communication method for transmitting the user data.

With this configuration, the receiver apparatus can receive the user data from the transmitter apparatus in accordance with the communication method in the notice information.

The transmitter apparatus further comprises selecting section for selecting the first light source used for transmitting the user data to the receiver apparatus from among the plurality of light sources.

In the transmitter apparatus, the selecting section preferably selects the first light source when receiving a communication request from the receiver apparatus.

In the transmitter apparatus, if a reception error of the user data from the receiver apparatus is received once or a plurality of times, the selecting section selects a light source other than the first light source that has transmitted the user data received in error, the selected light source being regarded as a new first light source.

With this configuration, if a reception error occurs due to a defect in the first light source, the status can be recovered.

The transmitter apparatus further comprises estimating section for estimating light sources visible in the receiver apparatus, wherein the selecting section selects the first light source from among the light sources that are estimated by the estimating section to be visible in the receiver apparatus.

With this configuration, it can be prevented that the light source of which visible light does not reach the receiver apparatus is used for transmitting information to the receiver apparatus, and the light source can be appropriately selected. Thus, a wasteful use of light sources can be prevented.

In the transmitter apparatus, the estimating section estimates the light sources visible in the receiver apparatus based on a direction where the receiver apparatus exists.

The transmitter apparatus further comprises a plurality of receiving elements. The estimating section estimates the direction where the receiver apparatus exists based on a time difference of receiving information from the receiver apparatus in the plurality of receiving elements.

The transmitter apparatus further comprises a plurality of receiving elements placed around the light sources. The estimating section estimates that the light sources placed in a range surrounded by the receiving elements received information from the receiver apparatus are visible in the receiving apparatus.

In the transmitter apparatus, the selecting section selects the first light source from among the light sources visible in the receiver apparatus based on information about the light sources visible in the receiver apparatus from the receiver apparatus.

In the transmitter apparatus, the selecting section selects the first light source from among the light sources visible in the receiver apparatus in accordance with a temporal change of the light sources visible in the receiver apparatus.

With this configuration, even if the receiver apparatus moves and the light sources visible in the receiver apparatus change, the light source can be appropriately selected.

In the transmitter apparatus, the selecting section comprises a plurality of selecting sections, which select the first light source from among the light sources that can become visible in the receiver apparatus within predetermined time.

With this configuration, the light source can be appropriately selected in view of the moving direction of the receiver apparatus.

In the transmitter apparatus, the selecting section comprises a plurality of selecting sections, which select the second and third light sources from among the light sources that are visible in any of a plurality of receiver apparatuses.

With this configuration, by sharing the second and third light sources among the plurality of receiver apparatuses, a decrease in light sources usable for transmitting the user data can be prevented.

According to an embodiment of the present invention, the plurality of light sources constitutes an illuminating device.

According to an embodiment of the present invention, a communication system includes the above-described transmitter apparatus and a receiver apparatus including a receiving section for receiving information from the transmitter apparatus through visible light.

According to an embodiment of the present invention, the receiving section specifies the third light source based on a pilot signal from the second light source and specifies the first light source based on notice information from the third light source so as to receive user data from the first light source.

According to an embodiment of the present invention, the receiving section includes light collecting section for collecting visible light from the transmitter apparatus and a plurality of photoreceivers for receiving the visible light collected by the light collecting section.

Effect of the Invention

According to the present invention, the receiver apparatus can specify a light source in a transmitter to transmit user data regardless of arrangement of light sources in the transmitter apparatus, and the degree of freedom of placing light sources can be increased.

BRIEF DESCRIPTION OF THE DRAWINGS

FIG. 13 illustrates an example of coordinate information.

FIG. 14 illustrates an example of the visible light source information.

FIG. 15 illustrates an example of the allocated light source information.

FIG. 19 illustrates an example of visible light source change information.

FIG. 24 illustrates a fourth example of measures taken in the communication system according to the second embodiment.

DETAILED DESCRIPTION OF PREFERRED EMBODIMENT OF THE INVENTION

First Embodiment

Figure 1:
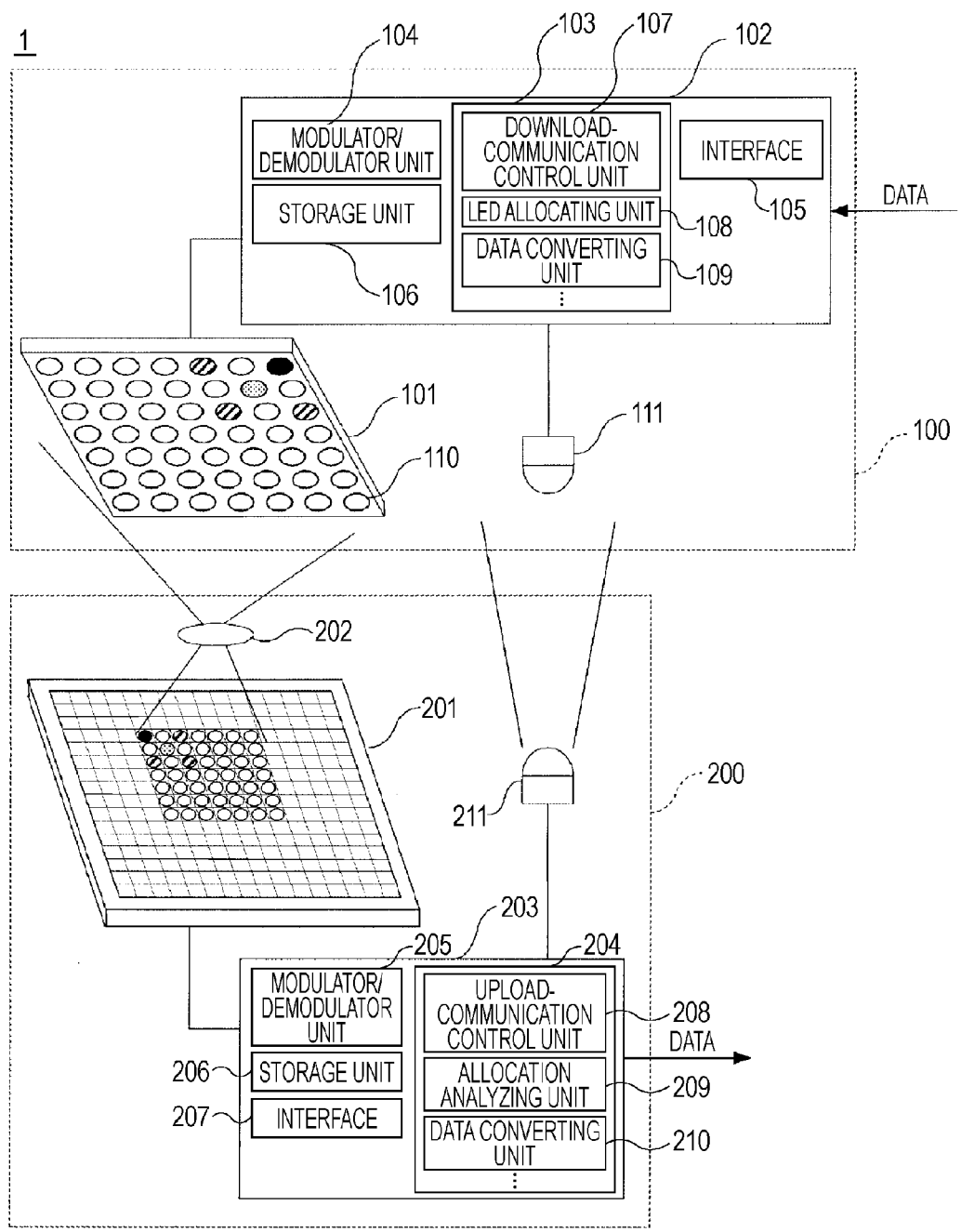
FIG. 1 is a configuration diagram illustrating a communication system according to a first embodiment of the present invention.

FIG. 1 is a configuration diagram illustrating a first embodiment of a communication system according to the present invention. A communication system 1 includes a transmitter apparatus 100 and a receiver apparatus 200. The transmitter apparatus 100 includes an illuminating unit 101, a transmission control unit 102 and a receiving unit 111. The illuminating unit 101 includes a plurality of LEDs 110. The transmission control unit 102 connects to the illuminating unit 101 to control the LEDs. The receiving unit 111 connects to the transmission control unit 102 to receive signals from the receiver apparatus 200.

The transmission control unit 102 includes a control unit 103, a modulator/demodulator unit 104, an interface 105, and a storage unit 106. The modulator/demodulator unit 104 connects to the control unit 103 and the illuminating unit 101 to control the LEDs 110 of the illuminating unit 101 and the receiving unit 111. The interface 105 connects to the control unit 103 and the outside to transmit and receive data from the outside. Furthermore, the control unit 103 includes a download-communication control unit 107, an LED allocating unit 108 serving as selecting section, and a data converting unit 109. The illuminating unit 101 includes an LED group composed of 7×7=49 LEDs 110 (0,0) to (6,6). This LED group includes a pilot signal LED 110 to transmit a predetermined specific pilot signal (LED 110 to which a pilot signal is allocated), a control LED 110 to transmit a control signal (LED 110 to which a control signal is allocated), and a user data LED 110 to transmit user data. In the example illustrated in FIG. 1, the LED 110 (0,0), the LED 110 (2,0), the LED 110 (0,2), and the LED 110 (2,2) serve as pilot signal LEDs 110. The LED (1,1) positioned at the geometrical barycenter of those four pilot signal LEDs 110 is the control LED 110, and the other LEDs are the user data LEDs 110. One LED serves as a light source here, but an LED set including one hundred LEDs or a device other than the LED can be used as a light source of each element.

On the other hand, the receiver apparatus 200 includes a receiving unit 201, an optical lens 202, a reception control unit 203 and a transmitting unit 211. The receiving unit 201 includes a plurality of photoreceivers which are arranged in a matrix pattern. The optical lens 202 optimally collects lights which are transmitted from the illuminating unit 101 to the receiving unit 201. The reception control unit 203 connects to the receiving unit 201. The transmitting unit 211 connects to the reception control unit 203 and transmits signals to the transmitter apparatus 100.

The reception control unit 203 includes a control unit 204, a modulator/demodulator unit 205, a storage unit 206, and lens. The modulator/demodulator unit 205 controls the receiving unit 201 and the transmitting unit 211. The interface 207 connects to the control unit 204 and an external user terminal. The interface 207 also transmits and receives data. The control unit 204 includes an upload-communication control unit 208, an allocation analyzing unit 209, and a data converting unit 210. Here, it is assumed that the photoreceivers arranged in a matrix pattern serve as the receiving unit 201, but any other type of receiving unit may be used as long as it includes a plurality of photoreceivers, such as CCD or CMOS. Alternatively, a receiver apparatus dedicated to illuminating-light communication may be used, or a function of a multi-purpose web camera or a camera in a mobile phone may be used.

In this embodiment, the receiver apparatus 200 connects to a user terminal (not illustrated) and communicates with the transmitter apparatus 100 based on signals transmitted from the pilot signal LEDs 110 and the control signal LED 110 at the position uniquely specified by the pilot signal LEDs 110 of the transmitter apparatus 100 serving as illumination.

In FIG. 1, a square whose corners are defined by the four pilot signal LEDs 110 can be seen. The pilot signal LEDs 110 continuously transmit specific signals, which can be recognized by the receiver apparatus 200. The receiver apparatus 200 can specify the position of the control signal LED 110 by recognizing the pilot signals transmitted from the four pilot signal LEDs 110 and by calculating the position of the barycenter of the square whose corners are defined by the four pilot signal LEDs 110.

In this embodiment, the barycenter of the square whose corners are defined by the four pilot signal LEDs 110 corresponds to the position of the control signal LED 110. Alternatively, the position of the control signal LED 110 may be specified by another geometrical method predetermined between the transmitter apparatus 100 and the receiver apparatus 200. For example, an intersection in the square may be regarded as the position of the control signal LED 110. When two pilot signal LEDs 110 are used, the midpoint therebetween or a position defined by a constant times the distance between the LEDs 110 on an extension of any of the pilot signal LEDs 110 may be regarded as the position of the control signal LED 110. Furthermore, when three pilot signal LEDs 110 are used, the position of the barycenter of a triangle whose apexes are defined by the three pilot signal LEDs 110 may be regarded as the position of the control signal LED 110. Even when there is only one pilot signal LED 110, the LED adjacent thereto may be regarded as the control signal LED 110, so that the receiver apparatus 200 can rapidly specify the position of the control signal LED 110.

In the above-described manner, the receiver apparatus 200 can specify the position of the control signal LED 110 among the LEDs 110 of the transmitter apparatus 100, and can demodulate or decode a control signal in synchronization with a pilot signal.

When two or more pilot signals are used and when the transmitter apparatus 100 generates one of the pilot signals with a time lag relative to the other pilot signal(s), the receiver apparatus 200 can specify a specific one of the pilot signal LEDs 110. With reference to the specific pilot signal LED 110, the receiver apparatus 200 can recognize the positions of all the other LEDs 110 more easily.

For example, in FIG. 1, the black circle indicates the specific pilot signal LED 110 and the black circles with stripes indicate the other pilot signal LEDs 110. In this case, the position of the pilot signal LED 110 (0,0) indicated by the black circle serves as a first reference point. The pilot signal generated by the pilot signal LED 110 (0,0) at the first reference point is the same as the pilot signals generated by the other pilot signal LEDs 110. However, the start timing of sending the signal is different. Therefore, the receiver apparatus 200 can specify the position of the pilot signal LED 110 (0,0) at the first reference point among the pilot signal LEDs 110.

Then, the position of the pilot signal LED 110 (0,2), which is the first pilot signal LED in the clockwise direction from the pilot signal LED 110 (0,0), is regarded as a second reference point. Based on the second reference point, the receiver apparatus 200 can specify the positions of the other LEDs 110. For example, if the transmitter apparatus 100 transmits information indicating that the first reference point is (0,0) and that the second reference point is (0,2) and information of an orthogonal coordinate system to the receiver apparatus 200 by using a control signal from the control signal LED 110, the receiver apparatus 200 can specify the positions of all the LEDs 110 based on the coordinates (x,y) of the orthogonal coordinate system.

Figure 2:
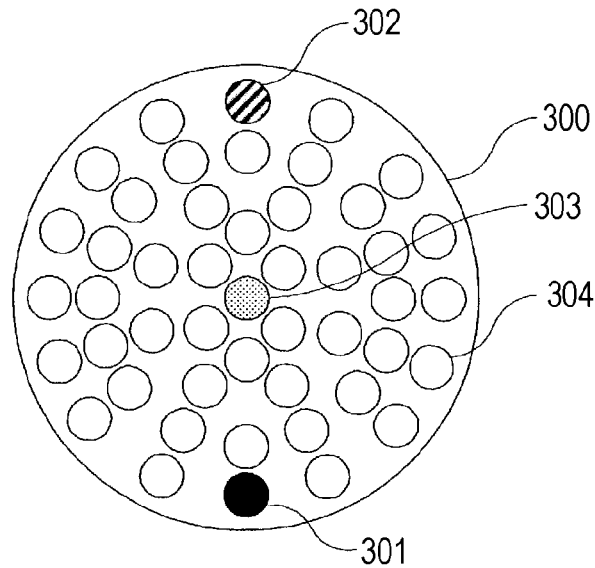
FIG. 2 illustrates another example of an illuminating unit.

Even if the illuminating unit 101 of the transmitter apparatus 100 is replaced by an illuminating unit 300 including concentrically-arranged LEDs as illustrated in FIG. 2, the position of a pilot signal LED 301 is defined as a first reference point, the position of a pilot signal LED 302 is defined as a second reference point, and an LED 303 positioned at the midpoint between the first and second reference points is defined as a control signal LED, in the same manner as described above. Then, if the transmitter apparatus 100 transmits information indicating that the control signal LED 303 is positioned at (0,0) and that the first reference point is (5,0) and information of a polar coordinate system to the receiver apparatus 200 by using a control signal, the receiver apparatus 200 can specify the positions of all the other LEDs included in the illuminating unit 300 based on the coordinates (r,φ) of the polar coordinate system. Alternatively, the receiver apparatus 200 can specify the positions of all the LEDs included in the illuminating unit 300 based on the orthogonal coordinate system, instead of the polar coordinate system.

Figure 3:
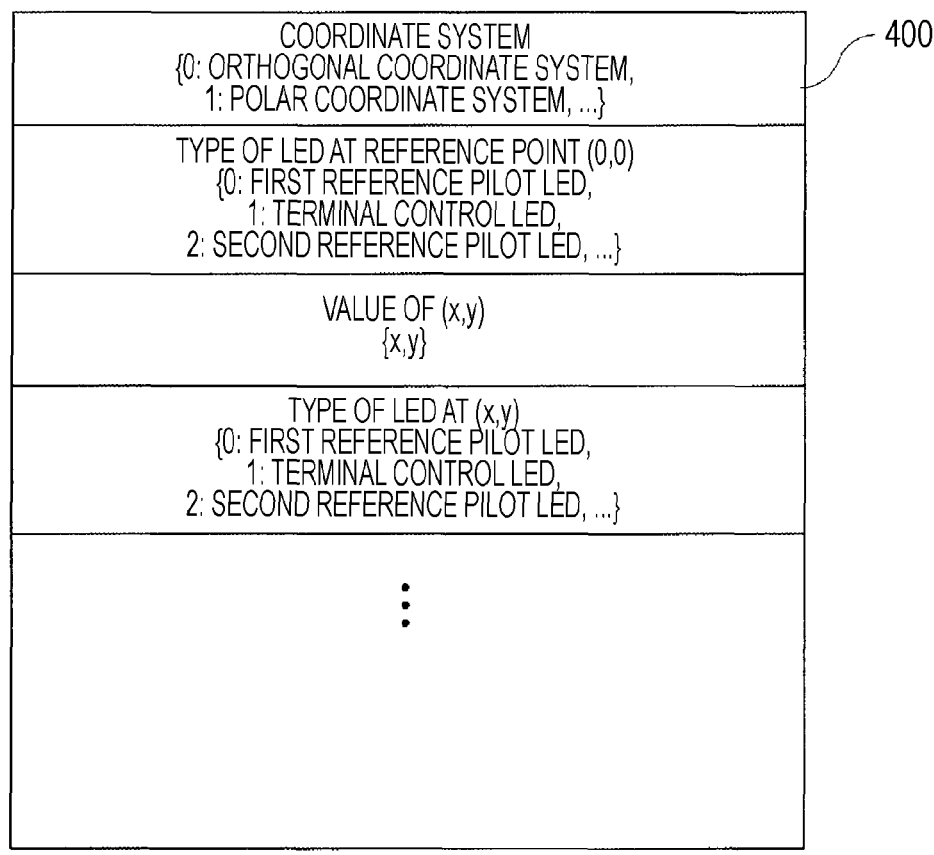
FIG. 3 illustrates an example of a message format of notice information.

In the case where the receiver apparatus 200 specifies the positions of all the LEDs 110 included in the illuminating unit 101 in the above-described manner, the control signal needs to include only four pieces of information: the type of coordinate system, the type of LED at (0,0), the value of predetermined (x,y) or (r,φ), and the type of LED at the predetermined (x,y) or (r,φ). An example of a message format 400 of these four pieces of information (notice information) is illustrated in FIG. 3. The receiver apparatus 200 can specify the positions of all the LEDs 110 based on the coordinates by referring to the four pieces of information transmitted from the transmitter apparatus 100.

The content of the above-described notice information is the same for all user terminals connected to the receiver apparatus 200 in an illuminating-light communication area. On the other hand, if communication of user data is performed between the transmitter apparatus 100 and a specific user terminal thereafter, information of the user terminal is required.

Figure 4:
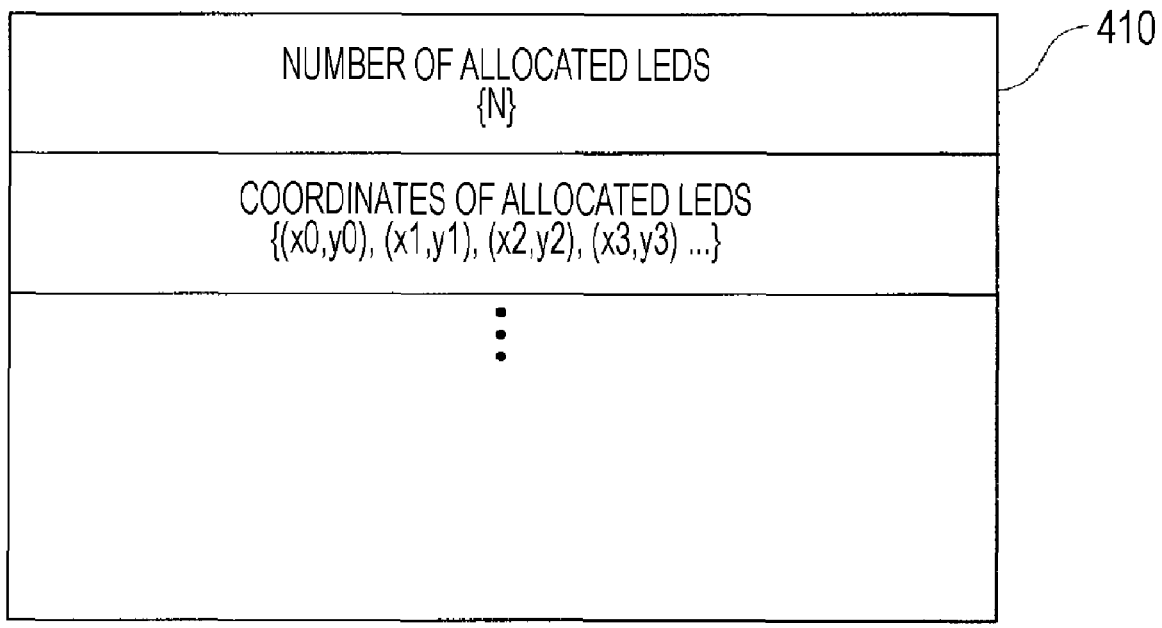
FIG. 4 illustrates an example of a message format of notice information of each user terminal.

The information of each user terminal includes the number of LEDs 110 used for communication of user data between the transmitter apparatus 100 and the user terminal, the coordinates of each LED 110 used for communication, and a communication method. The information is transmitted as notice information from the transmitter apparatus 100 to the receiver apparatus 200. The information about a communication method indicates parallel communication, for example, or may be control information for performing communication by using serial data as parallel data by using each LED 110, or may be information indicating that a packet is transmitted in each LED 110 by using each LED 110. That is, the communication method is not always predetermined. An example of a message format 410 of notice information of each user terminal is illustrated in FIG. 4. After that, each LED 110 individually transmits a packet to a user terminal on the other end of communication.

Figure 5:
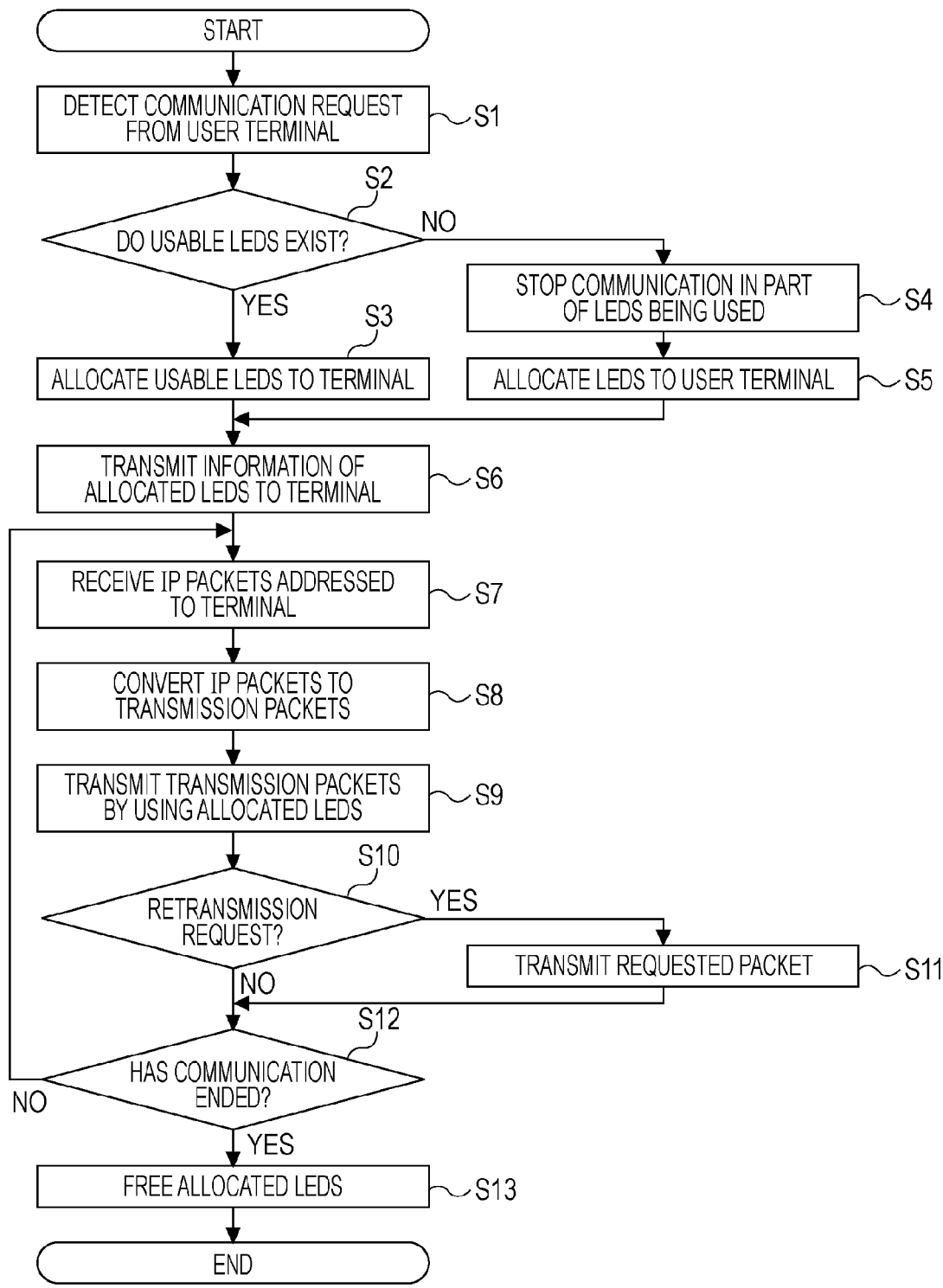
FIG. 5 is a first flowchart illustrating a flow of communication in the communication system according to the first embodiment.
Figure 6:
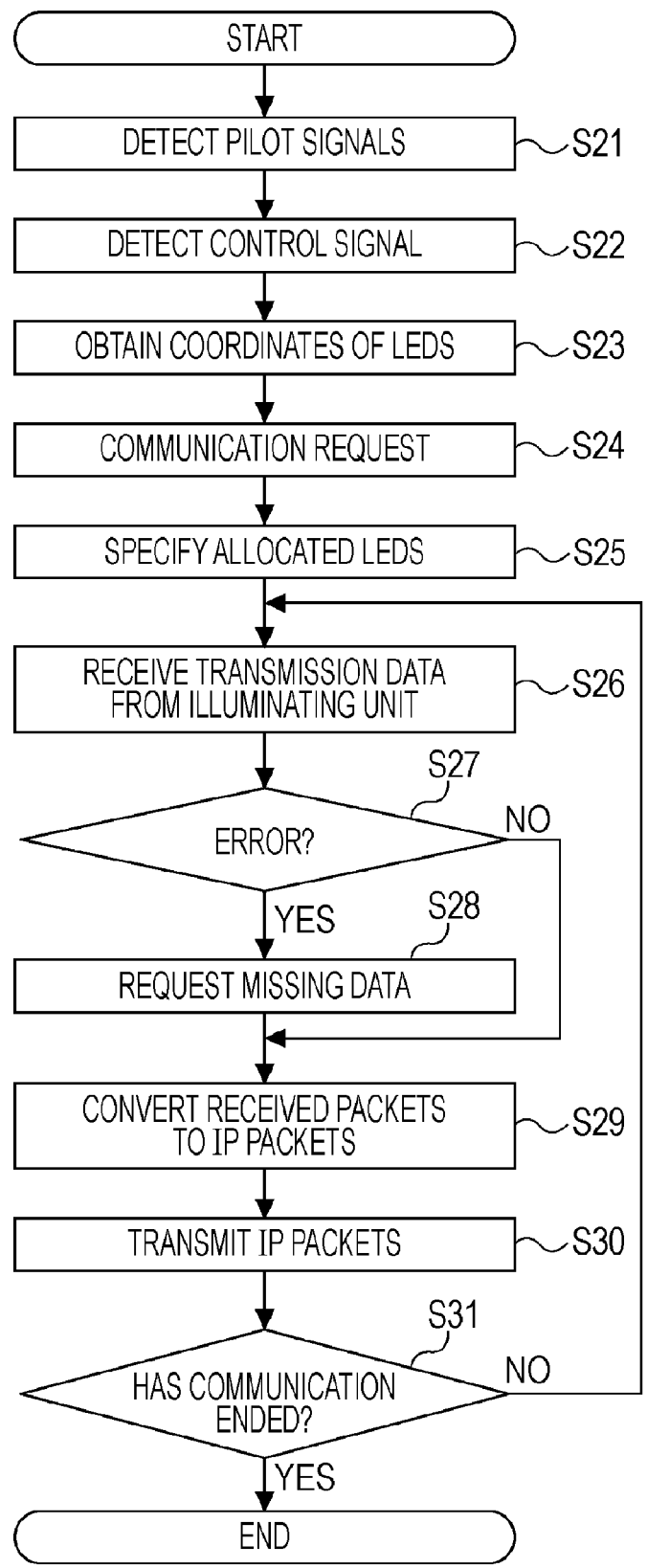
FIG. 6 is a second flowchart illustrating a flow of communication in the communication system according to the first embodiment.

FIGS. 5 and 6 are flowcharts illustrating a flow of communication in the communication system 1. FIG. 5 illustrates a process of the control unit 103 in the transmitter apparatus 100, and FIG. 6 illustrates a process of the control unit 204 in the receiver apparatus 200. Note that the transmitter apparatus 100 constantly transmits a pilot signal and a control signal. The control signal includes four pieces of information (notice information): the type of coordinate system is an orthogonal coordinate system, the LED at (0,0) is the pilot signal LED 110 at the first reference point, the value of (x,y) is (2,0), and the LED at (2,0) is the pilot signal LED 110 at the second reference point.

After the receiver apparatus 200 connected to the user terminal has entered an area of illuminating light of the transmitter apparatus 100, the upload-communication control unit 208 specifies pilot signals from the four pilot signal LEDs 110 (step S21 in FIG. 6) and specifies the control signal LED 110 based on the positions of the four pilot signal LEDs 110 transmitting the pilot signals (step S22 in FIG. 6).

At this time, the start timing of sending the signal of the pilot signal LED 110 (0,0) at the first reference point is different from that of the signals of the three other pilot signal LEDs 110, and thus the upload-communication control unit 208 can distinguish the pilot signal LED 110 at the first reference point from the three other pilot signal LEDs 110. Also, the upload-communication control unit 208 regards the position of the pilot signal LED 110 (0,2), which is the first pilot signal LED in the clockwise direction from the pilot signal LED 110 (0,0) at the first reference point, as the second reference point. The above-described specifying method is predetermined.

The allocation analyzing unit 209 obtains the coordinates of the LEDs 110 with reference to the notice information included in the control signal from the specified control signal LED 110 (step S23 in FIG. 6). As described above, the notice information includes the information indicating: the type of coordinate system is an orthogonal coordinate system, the LED at (0,0) is the pilot signal LED 110 at the first reference point, the value of (x,y) is (2,0), and the LED at (2,0) is the pilot signal LED 110 at the second reference point. The allocation analyzing unit 209 can indicate the positions of all the LEDs 110 included in the illuminating unit 101 by using the coordinates (x,y) of the orthogonal coordinate system based on the notice information.

Then, when receiving a communication request from the user terminal connected to the receiver apparatus 200, the upload-communication control unit 208 requests communication to the transmitter apparatus 100 via the transmitting unit 211 (step S24 in FIG. 6).

In the side of the transmitter apparatus 100, the download-communication control unit 107 detects the communication request from the receiver apparatus 200 in the receiving unit 111 (step S1 in FIG. 5), and then the LED allocating unit 108 searches for LEDs 110 usable for communication with the user terminal requesting communication (the LEDs 110 that are not used for communication with another user terminal) among the LEDs 110 included in the illuminating unit 101 (step S2 in FIG. 5).

If usable LEDs 110 exist, the LED allocating unit 108 selects the LED 110 to transmit user data addressed to the user terminal (user data LED 110) from among the usable LEDs 110 and allocates the user data to the selected LED 110 (selection of the LED 110 to be used for communication of user data) (step S3 in FIG. 5). The LED 110 allocated here may be one or more LEDs. The LED allocating unit 108 may determine the number of allocated LEDs 110 in accordance with a required data rate. Furthermore, if the data rate varies, the LED allocating unit 108 may change the number of assigned LEDs 110 as necessary in accordance with the variation in data rate.

On the other hand, if all the LEDs 110 included in the illuminating unit 101 are being used for communication between the transmitter apparatus 100 and another user terminal, the LED allocating unit 108 stops communication in part of the LEDs 110 that are being used (step S4 in FIG. 5) and allocates those LEDs 110 to the user terminal requesting communication (step S5 in FIG. 5).

Then, the LED allocating unit 108 transmits the coordinate information of the allocated LEDs 110 (e.g., (5,0), (5,1), (5,2), (5,3), . . . ) to the receiver apparatus 200 by using the control signal LED 110 (step S6 in FIG. 5).

The allocation analyzing unit 209 of the receiver apparatus 200 analyzes the coordinate information and specifies user data LEDs 110 (step S25 in FIG. 6). In this way, negotiation for communication is performed.

After the negotiation, the download-communication control unit 107 of the transmitter apparatus 100 receives IP packets addressed to the user terminal from the outside (step S7 in FIG. 5), and then the data converting unit 109 performs data conversion, that is, encodes the IP packets, adds an error check bit, adds sequence numbers, and adds communication control information, so as to generate transmission packets (step S8 in FIG. 5). Then, the download-communication control unit 107 transmits the generated transmission packets to the receiver apparatus 200 (step S9 in FIG. 5). In this case, the number of transmission packets that can be simultaneously transmitted by the download-communication control unit 107 is the same as the number of LEDs 110 allocated by the LED allocating unit 108. The communication can be performed at a data rate according to the number of LEDs 110.

Alternatively, the speed of communication can be increased by section of retransmission or the like. Specifically, after receiving the transmission packets (step S26 in FIG. 6), the upload-communication control unit 208 of the receiver apparatus 200 determines whether the transmission packets have been received normally (step S27 in FIG. 6). If an error occurs (if the packets have not normally been received), the upload-communication control unit 208 requests retransmission of the transmission packet data to the transmitter apparatus 100 via the transmitting unit 211 (step S28 in FIG. 6). For example, the upload-communication control unit 208 manages the received transmission packets. When detecting that a reception packet is missing, the upload-communication control unit 208 requests retransmission of the missing packet.

The download-communication control unit 107 of the transmitter apparatus 100 determines whether a retransmission request has been received (step S10 in FIG. 5). If the retransmission request is detected, the download-communication control unit 107 transmits the requested transmission packet (step S11 in FIG. 5).

If the receiver apparatus 200 normally receives the transmission packets, the data converting unit 210 performs data conversion, such as decoding, on the transmission packets to obtain the original IP packets (step S29 in FIG. 6) and transmits the IP packets to the user terminal via the interface 207 (step S30 in FIG. 6).

The transmitter apparatus 100 and the receiver apparatus 200 determine whether the communication has ended (step S12 in FIG. 5 and step S31 in FIG. 6). If the communication has not ended, the process is repeated from step S7 in the transmitter apparatus 100, whereas the process is repeated from step S26 in the receiver apparatus 200. On the other hand, if the communication has ended, the LED allocating unit 108 of the transmitter apparatus 100 frees the LEDs 110 that were allocated in step S3 or step S5 (step S13 in FIG. 5), and then the entire process ends.

In the above-described manner, high-speed communication can be performed by using the plurality of LEDs 110 serving as a light source of the transmitter apparatus 100 as illumination. Also, by allocating the LEDs 110, not only a single user terminal but also a plurality of user terminals can perform communication at the same time. Furthermore, the communication can be performed by using a freely-placed LED group without predetermining the positions of the LEDs 110.

If packet loss occurs due to an end of life of part of the LEDs 110, the problem can be appropriately dealt with in the following manner. If a retransmission request of the transmission packet transmitted from a specific LED 110 is transmitted a predetermined number of times or more in series, the LED allocating unit 108 of the transmitter apparatus 100 cancels the allocation of the LED 110 to the user terminal. In that case, the LED allocating unit 108 may allocate another LED 110.

For example, assume a case where four LEDs 110 (5,0), (5,1), (5,2), and (5,3) are allocated to the user terminal and the LEDs 110 transmit transmission packets having sequence numbers 4N, 4N+1, 4N+2, and 4N+3, respectively. In this case, if the LED 110 (5,1) cannot perform communication due to an end of life or break, an error constantly occurs in the transmission packet from the LED 110 (5,1), so that the upload-communication control unit 208 of the receiver apparatus 200 repeatedly requests retransmission of the transmission packet having the sequence number 4N+1. At this time, if retransmission of the transmission packet 4N+1 is requested a continuous predetermined number of times (e.g. twenty times), the LED allocating unit 108 cancels allocation of the LED 110 (5,1). After that, the transmission packets having sequence numbers 3N, 3N+1, and 3N+2 may be transmitted by the LEDs 110 (5,0), (5,2), and (5,3). Alternatively, the LED allocating unit 108 may newly allocate the LED 110 (6,0), and the LED 110 (6,0) may transmit the transmission packet that was to be transmitted by the LED 110 (5,1). Then, if the LED 110 (5,1) is allowed to regularly transmit a transmission packet and if the packet can be transmitted, it is determined that the cause of mal-detection is not the end of life of the LED 110 (5,1) but temporary interruption by something. Then, the LED 110 (5,1) can be used again so as to prevent a decrease in usage efficiency of the LEDs 110.

As described above, by reallocating the LED 110 in response to the retransmission request continuously transmitted a predetermined number of times or more, a failure of the LED 110 can be appropriately dealt with. However, a specific transmission packet cannot be received by the receiver apparatus 200 until reallocation has been done, which can result in significant delay. In that case, the above-described problem can be overcome by allowing another LED 110 to transmit the transmission packet to be retransmitted. This is described below with reference to FIG. 7.

Figure 7:
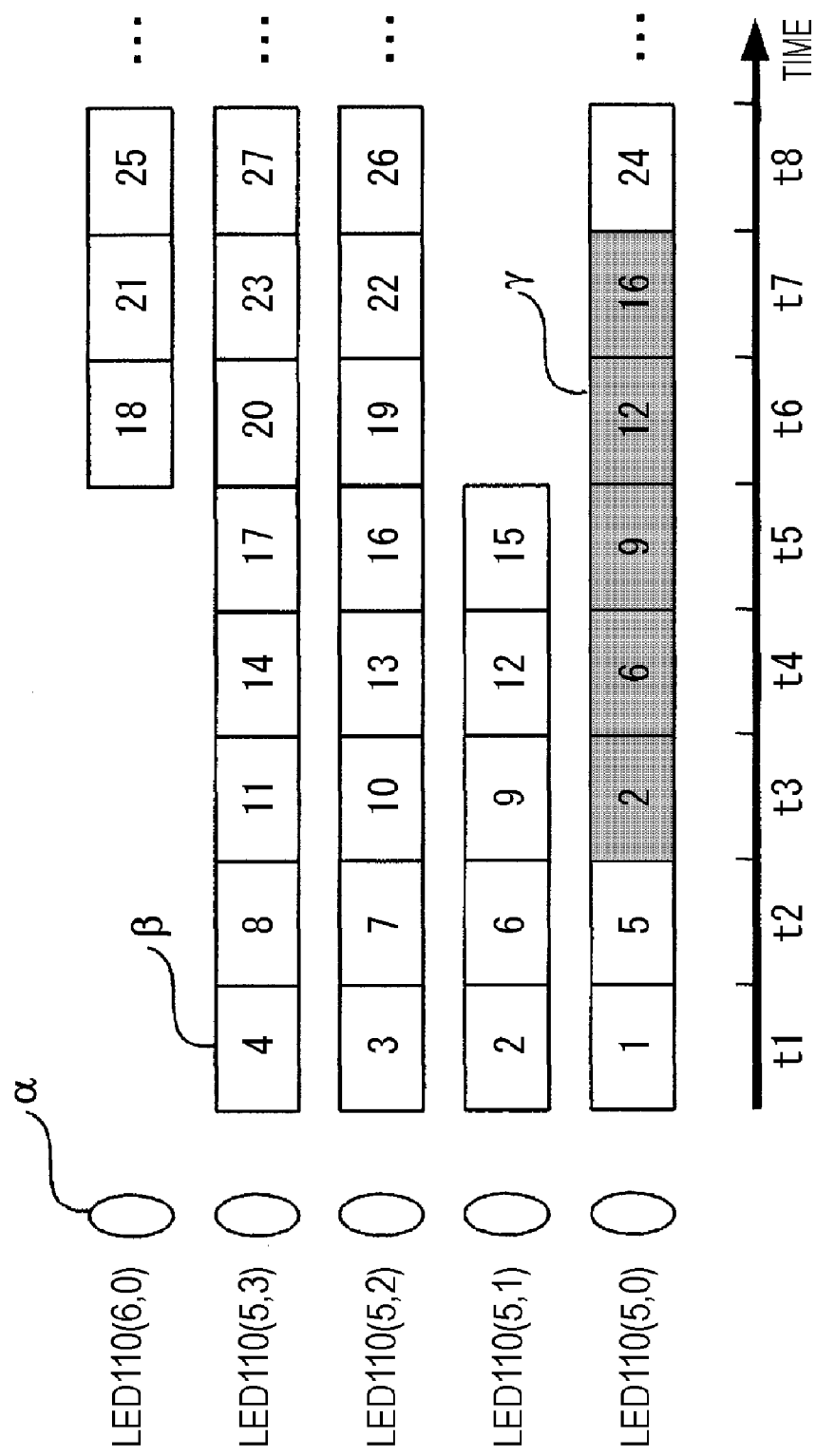
FIG. 7 illustrates reallocation of LEDs.

In FIG. 7, α indicates an LED, for example, the LED 110 illustrated in FIG. 1. Here, assume that the LEDs 110 (5,0), (5,1), (5,2), and (5,3) are allocated to the user terminal. β indicates a transmitted packet, and the number therein indicates a sequence number of the transmission packet. The horizontal axis indicates time. γ indicates a packet to be retransmitted. Assume that the LEDs 110 (5,0), (5,1), (5,2), and (5,3) of the transmitter apparatus 100 transmit transmission packets 1, 2, 3, and 4 at time t1 from the start of communication, but that the receiver apparatus 200 cannot receive the transmission packet 2 from the LED 110 (5,1) due to failure of the LED 110 (5,1). At time t2, the transmission apparatus 100 transmits transmission packets 5, 6, 7, and 8, and the receiver apparatus 200 transmits a retransmission request of the transmission packet 2. At time t3, the missing transmission packet 2 is transmitted by the LED 110 (5,0), different from the LED 110 (5,1), as a retransmission packet 2. Also, the LEDs 110 (5,1), (5,2), and (5,3) transmit transmission packets 9, 10, and 11. Then, after the time elapses to time t5 while the transmission packets from the LED 110 (5,1) cannot be received by the receiver apparatus 200, the allocation control unit 108 of the transmitter apparatus 100 ends using the LED 110 (5,1) and newly allocates the LED (6,0). At this time, the transmitter apparatus 100 may transmit information about the reallocation to the receiver apparatus 200 by using the control signal LED 110 or the user data LED 110. Then, from time t6, transmission is performed by the LEDs 110 (5,0), (5,2), (5,3), and (6,0). The above-described control can suppress delay of transmission packets.

According to the description of this embodiment, the receiver apparatus 200 transmits a retransmission request if the receiver apparatus 200 cannot normally receive a transmission packet from the transmitter apparatus 100, and the transmitter apparatus 100 retransmits the packet in response to the retransmission request. Alternatively, the receiver apparatus 200 may notify the transmitter apparatus 100 of missing of the packet or data, instead of transmitting the retransmission request. In response to the notification about missing, the transmitter apparatus 100 may perform a retransmitting process or a process of reallocating the LED 110.

In the illuminating-light communication, the receiver apparatus 200 may notify the transmitter apparatus 100 of a specific number, such as a random value or the serial number of the receiver apparatus 200, during negotiation, and encrypted communication may be performed based on the value in order to ensure confidentiality of data. By using such encryption, confidentiality of data can be ensured and the data can be transmitted to only a specific user terminal in an office or a place where the general public exists.

Second Embodiment

Figure 8:
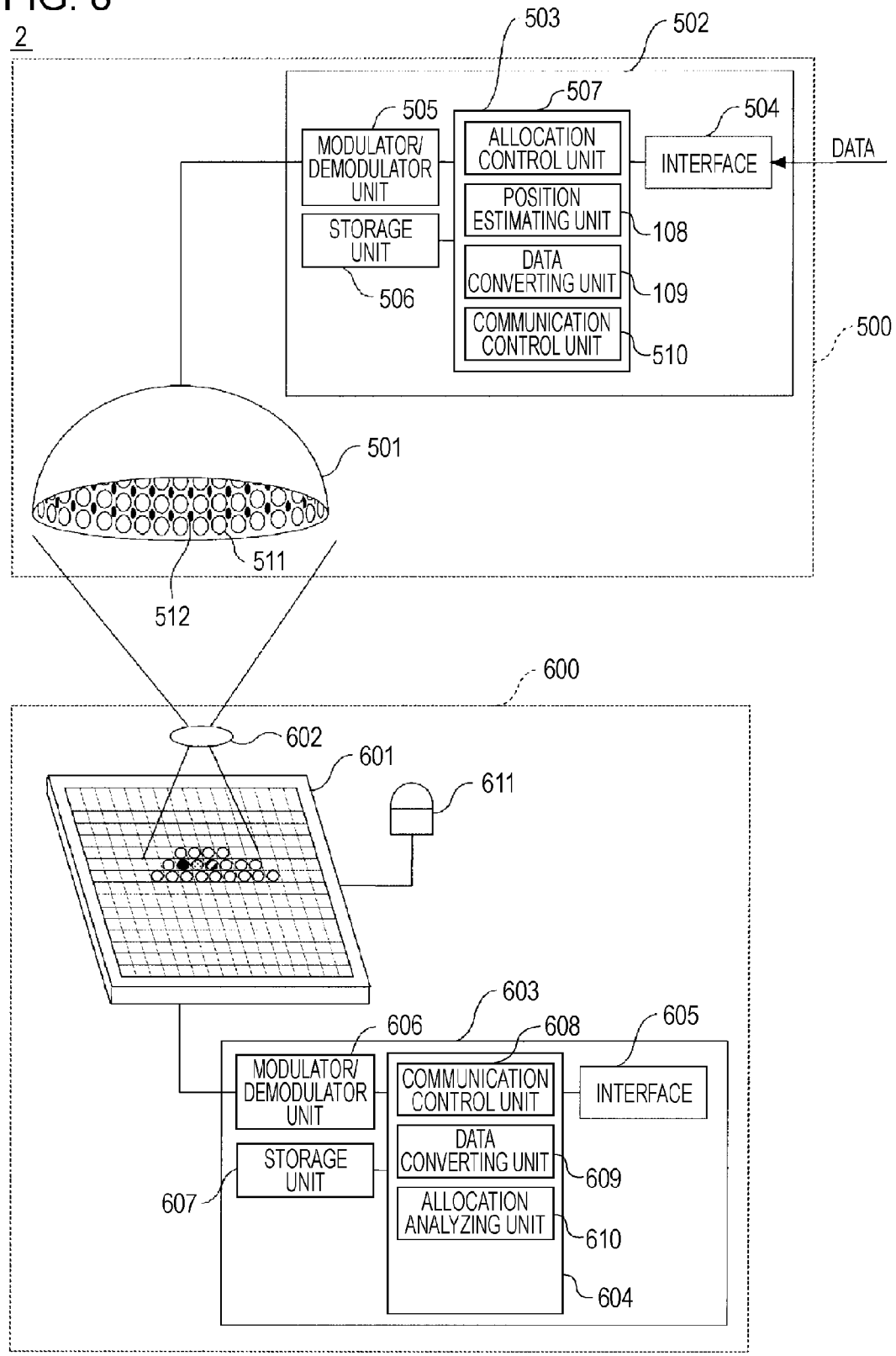
FIG. 8 is a configuration diagram illustrating a communication system according to a second embodiment of the present invention.

FIG. 8 is a configuration diagram illustrating a second embodiment of the communication system according to the present invention.

A communication system 2 includes an illumination access point (AP) 500 serving as a transmitter apparatus and an access terminal (AT) 600 serving as a receiver apparatus. The AP 500 includes an illuminating unit 501 including a plurality of light sources and an AP control unit 502.

The illuminating unit 501 includes a plurality of light sources 511 placed on an illuminating surface and a plurality of photoreceivers 512 that are placed on the surface where the light sources 511 are placed and that receive data from the AT 600.

The AP control unit 502 includes a control unit 503, an interface 504 to externally input/output data, a modulator/demodulator unit 505, and a storage unit 506. The modulator/demodulator unit 505 performs modulation of the light sources 511 and demodulation of signals from the AT 600 received by the photoreceivers 512. The control unit 503 includes an allocation control unit 507, a position estimating unit 508, a data converting unit 509 and a communication control unit 510. The allocation control unit 507 allocates the plurality of light source 511 as transmitting units of a pilot signal, a control signal, and a data signal to each user. The position estimating unit 508 estimates the direction where the AT 600 exists based on signals from the AT 600 received by the photoreceivers 512. The data converting unit 509 performs encoding or interleave on data from the interface 504 so that the data is adaptable to the modulator/demodulator unit 505 and to perform decoding on received data. The communication control unit 510 controls the modulator/demodulator unit 505 and the data converting unit 509 and control communication with the AT 600, that is, connection/disconnection to/from the AT 600 and call control such as Ack (a packet message used in the Transmission Control Protocol to acknowledge receipt of a packet) and Nack (a Negative Acknowledgement, i.e., I didn't get it, not received) of data from the AT 600.

The position estimating unit 508 estimates the direction where the AT 600 exists based on signals from the AT 600 received by the photoreceivers 512 and further estimates the light sources 511 that are visible in the AT 600 among the light sources 511 based on the estimated direction. In this embodiment, the plurality of photoreceivers 512 are arranged on the surface where the light sources 511 are placed in the illuminating unit 501. Thus, it is estimated that the light sources 511 in the range surrounded by the plurality of photoreceivers 512 that can receive a signal from a transmitting unit 611 near a receiving unit 601 (described below) of the AT 600 can be visible from the receiving unit 601.

The allocation control unit 507 allocates the light sources 511 based on information about the direction of the AT 600 estimated by the position estimating unit 508. In the example illustrated in FIG. 8, the direction where the AT 600 exists is estimated based on a reception status of the photoreceivers 512 placed on the surface where the light sources 511 are placed. However, the present invention is not limited to this method. Another example is illustrated in FIG. 9.

Figure 9:
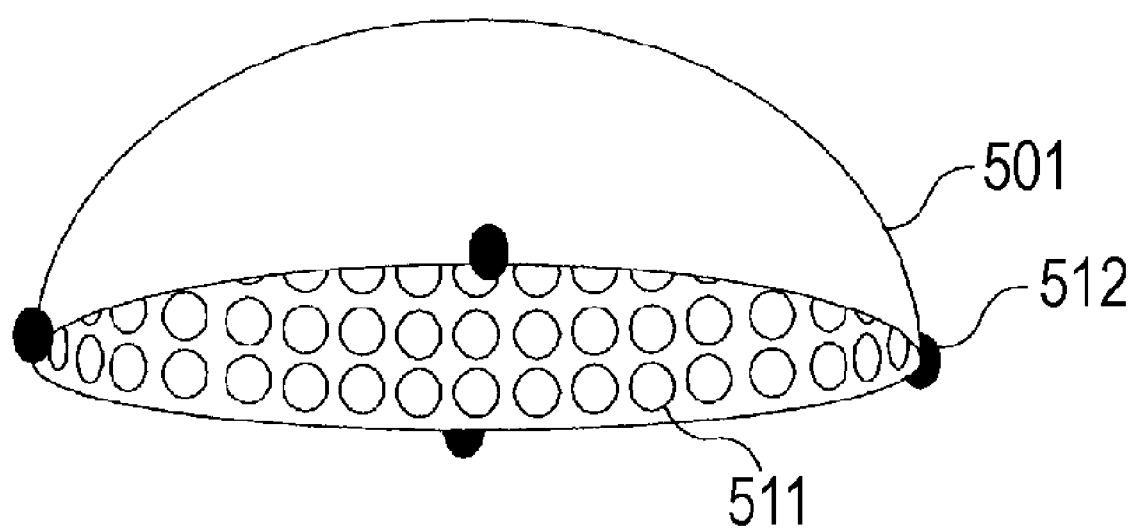
FIG. 9 illustrates another example of an illuminating unit.

Referring to FIG. 9, four photoreceivers 512 are arranged at a lower edge of the illuminating unit 501 such that the photoreceivers 512 are visible in the AT 600. When the illuminating unit 501 is placed on a ceiling, the AT 600 is inevitably positioned on the lower side of the illuminating unit 501. When the respective photoreceivers 512 receive signals from the AT 600, the position estimating unit 508 detects a difference in time when the signals reach the respective photoreceivers 512 and specifies the direction of the source of the signals based on a detection result, so as to determine the direction where the AT 600 exists. Alternatively, a signal from the AT 600 can be received by using an imaging device, such as a CCD, provided with a wide-angle lens as the photoreceiver 512 so as to determine the direction of the AT 600 at the same time. Any method can be used as long as the direction of the AT 600 requesting communication can be determined, and the light sources 511 that are visible in the AT 600 can be estimated based on the direction. Hereinafter, it is assumed that the position of the AT 600 is estimated in the method based on FIG. 8 in this embodiment.

The pilot signals are specific signals that are periodically transmitted and can be specified or determined by any AT 600. The light source 511 to transmit a control signal is placed at the position that is geometrically determined based on the positions of the plurality of light sources 511 to transmit the pilot signals. In this embodiment, it is assumed that the light source 511 positioned at the midpoint between the two light sources 511 to transmit the pilot signals serves as a light source to transmit a control signal. The control signal is used for transmitting information in synchronization with the pilot signals, and the AT 600 can demodulate the control signal by synchronizing with the pilot signals. The two light sources 511 to transmit the pilot signals periodically transmit the pilot signals with time difference. The AT 600 can distinguish the two pilot signals 1 and 2 from each other and can demodulate the control signal in synchronization with any of the pilot signals. Hereinafter, the pilot signal synchronizing with the control signal is called pilot signal 1.

The AT 600 includes a photoreceiver group and also includes the receiving unit 601, an optical system 602, a transmitting unit 611 to transmit signals, and an AT control unit 603. The receiving unit 601 individually receives signals from the light source group of the illuminating unit 501. The optical system 602 collects illuminating light from the illuminating unit 501 to the receiving unit 601.

The AT control unit 603 includes a control unit 604, an interface 605 to externally input/output data, a modulator/demodulator unit 606, and a storage unit 607. The modulator/demodulator unit 606 demodulates signals from the respective light sources 511 received by the receiving unit 601 and modulate signals to be transmitted from the transmitting unit 611. The control unit 604 includes a data converting unit 609, a communication control unit 608 and an allocation analyzing unit 610. The data converting unit 609 performs encoding or interleaves on data from the interface 605 so that the data is adaptable to the modulator/demodulator unit 606. The communication control unit 608 controls the modulator/demodulator unit 606 and the data converting unit 609 and controls communication with the AP 500, that is, connection/disconnection to/from the AP 500 and calls control such as Ack (a packet message used in the Transmission Control Protocol to acknowledge receipt of a packet) and Nack (a Negative Acknowledgement, i.e., I didn't get it, not received) of data from the AP 500. The allocation analyzing unit 610 analyzes the light sources 511 allocated to the AT 600 by the AP 500.

Figure 10:
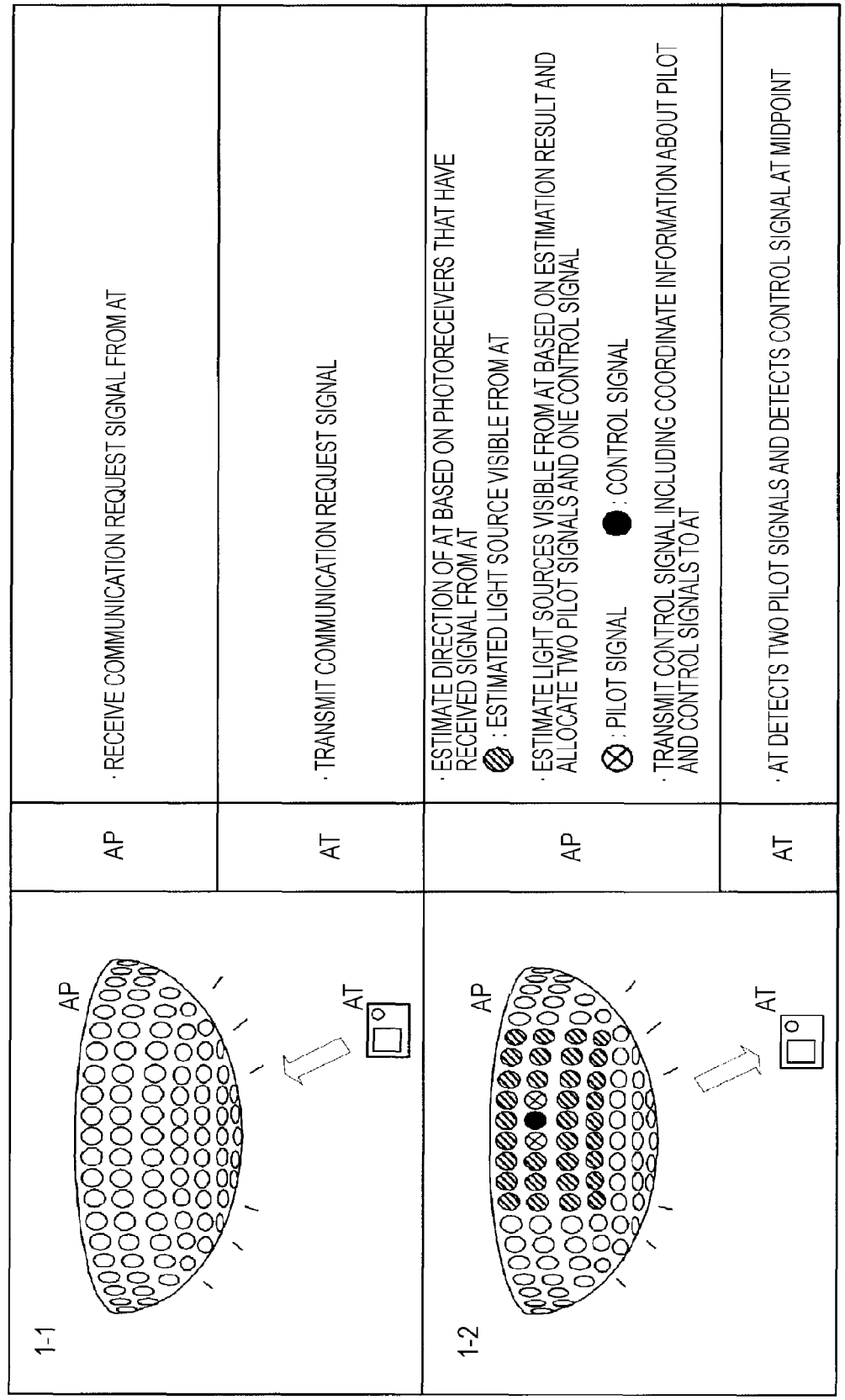
FIG. 10 illustrates a first example of measures taken in the communication system according to the second embodiment.
Figure 11:
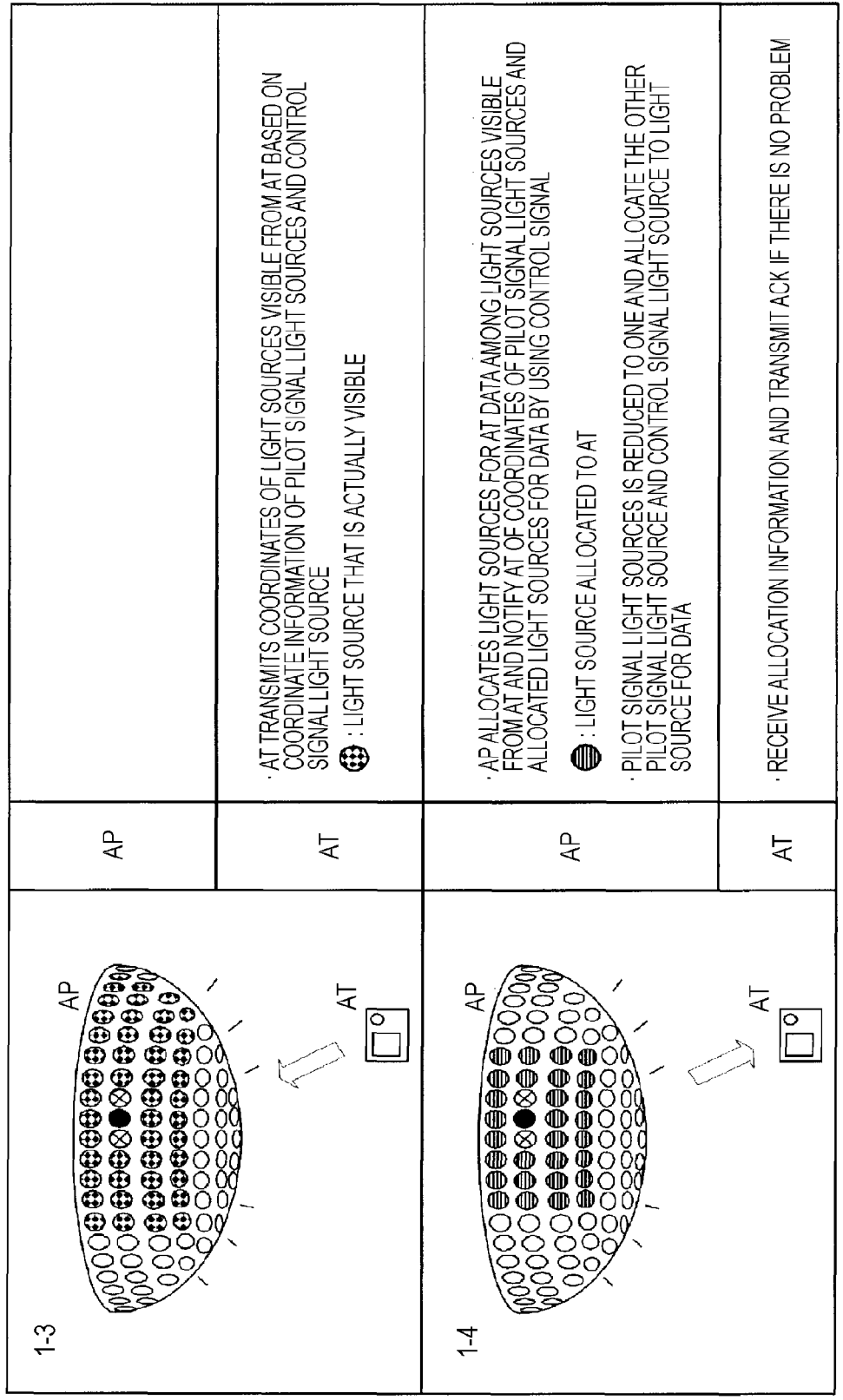
FIG. 11 illustrates a first example of measures taken in the communication system according to the second embodiment.
Figure 12:
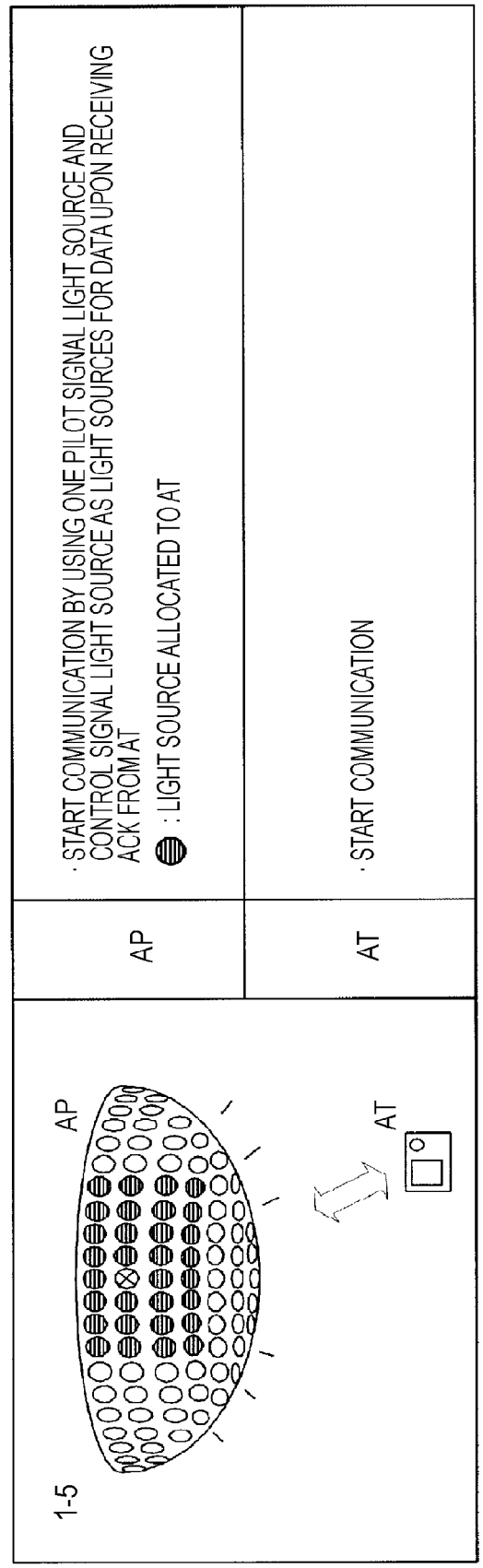
FIG. 12 illustrates a first example of measures taken in the communication system according to the second embodiment.

FIGS. 10 to 12 illustrate an embodiment of starting communication in the communication system 2. These figures illustrate only the AP 500 as illumination in which the plurality of light sources 511 are placed on the inner surface of the hemisphere and the AT 600 as a terminal for simplicity.

In 1-1 of FIG. 10, the AT 600 transmits a communication request signal to the AP 500 in order to start communication with the AP 500.

In 1-2 of FIG. 10, after the AP 500 has received the communication request signal from the AT 600, the position estimating unit 508 of the AP 500 estimates that the light sources 511 in the range surrounded by the photoreceivers 512 that have received the communication request signal from the AT 600 are visible in the AT 600. Based on the estimation result, the allocation control unit 507 allocates pilot signals 1 and 2 to two of the light sources 511 that are visible in the AT 600 and also allocates a control signal to one of the light sources 511. At this time, the allocation control unit 507 performs allocation so that the light source 511 to which the control signal is allocated is positioned at the midpoint between the light sources 511 to which the pilot signals 1 and 2 are allocated. Furthermore, the allocation control unit 507 notifies the AT 600 of coordinate information of the two light sources 511 to which the pilot signals 1 and 2 are allocated and coordinate information of the light source 511 to which the control signal is allocated by using the control signal.

FIG. 13 illustrates an example of the coordinate information. The coordinate information includes the name of signal, a coordinate system, the number of light sources 511 to which pilot signals are allocated, the coordinates of the light source 511 to which the pilot signal 1 is allocated, the coordinates of the light source 511 to which the pilot signal 2 is allocated, and the coordinates of the light source 511 to which the control signal is allocated.

After the AT 600 has received the two pilot signals 1 and 2, the allocation analyzing unit 610 specifies the light source 511 to which the control signal is allocated (control signal light source) positioned at the midpoint between the light sources 511 to which the two pilot signals 1 and 2 are allocated (pilot signal light sources), and the communication control unit 608 decodes the control signal in synchronization with the two pilot signals 1.

In 1-3 of FIG. 11, after the control signal has been decoded, the allocation analyzing unit 610 notifies the AT 600 of coordinate information of the light sources 511 that are visible from the AT 600 (visible light source information) based on coordinate information of the pilot signal light source 511 to which the pilot signal 1 is allocated, the pilot signal light source 511 to which the pilot signal 2 is allocated, and the control signal light source 511 to which the control signal is allocated.

FIG. 14 illustrates an example of the visible light source information. The visible light source information includes the name of signal, a coordinate system, the number of light sources 511 visible from the AT 600, and information of the coordinates of each light source 511 visible from the AT 600.

In 1-4 of FIG. 11, the allocation control unit 507 obtains the visible light source information from the AT 600, registers the visible light source information in the storage unit 506, allocates user data to one or a plurality of the light sources 511 specified as visible so as to regard the light source(s) 511 as the light source(s) 511 to transmit the user data (user data light source(s)), and then notifies the AT 600 of the information of the user data light source(s) 511 (allocated light source information). At this time, the allocation control unit 507 reduces the pilot signal light sources 511 to one and allocates the user data to the other pilot signal light source 511 and the control signal light source 511, which are used as the user data light sources 511 for transmitting the user data.

FIG. 15 illustrates an example of the allocated light source information. The allocation analyzing unit 610 of the AT 600 receives the allocation information and then transmits Ack (a packet message used in the Transmission Control Protocol to acknowledge receipt of a packet) to the AP 500.

In 1-5 of FIG. 12, the AP 500 receives Ack (a packet message used in the Transmission Control Protocol to acknowledge receipt of a packet) and starts communication of user data by using the user data light sources 511.

In the above-described process, even when the AT 600 exists at the position of being able to view only part of the light sources 511 of the illuminating unit 501, communication can be performed by using only the light sources 511 visible from the AT 600 by appropriately setting the pilot signal light sources 511 and the control signal light source 511, so that a wasteful use of the light sources 511 can be prevented. Here, once negotiation has been done and communication has been established, only one pilot signal light source 511 is required for synchronization with communication timing. Also, the control signal can be transmitted/received while distinguishing the control signal from a user data packet by using the user data light sources 511 by identifying a packet header or the like, and thus only one pilot signal light source 511 is required in addition to the plurality of user data light sources 511.

Therefore, after negotiation has been established, all the light sources 511 visible from the AT 600, except one pilot signal light source 511, can be used as the user data light sources 511, so that the data rate can be increased and the light sources 511 can be efficiently used.

Figure 16:
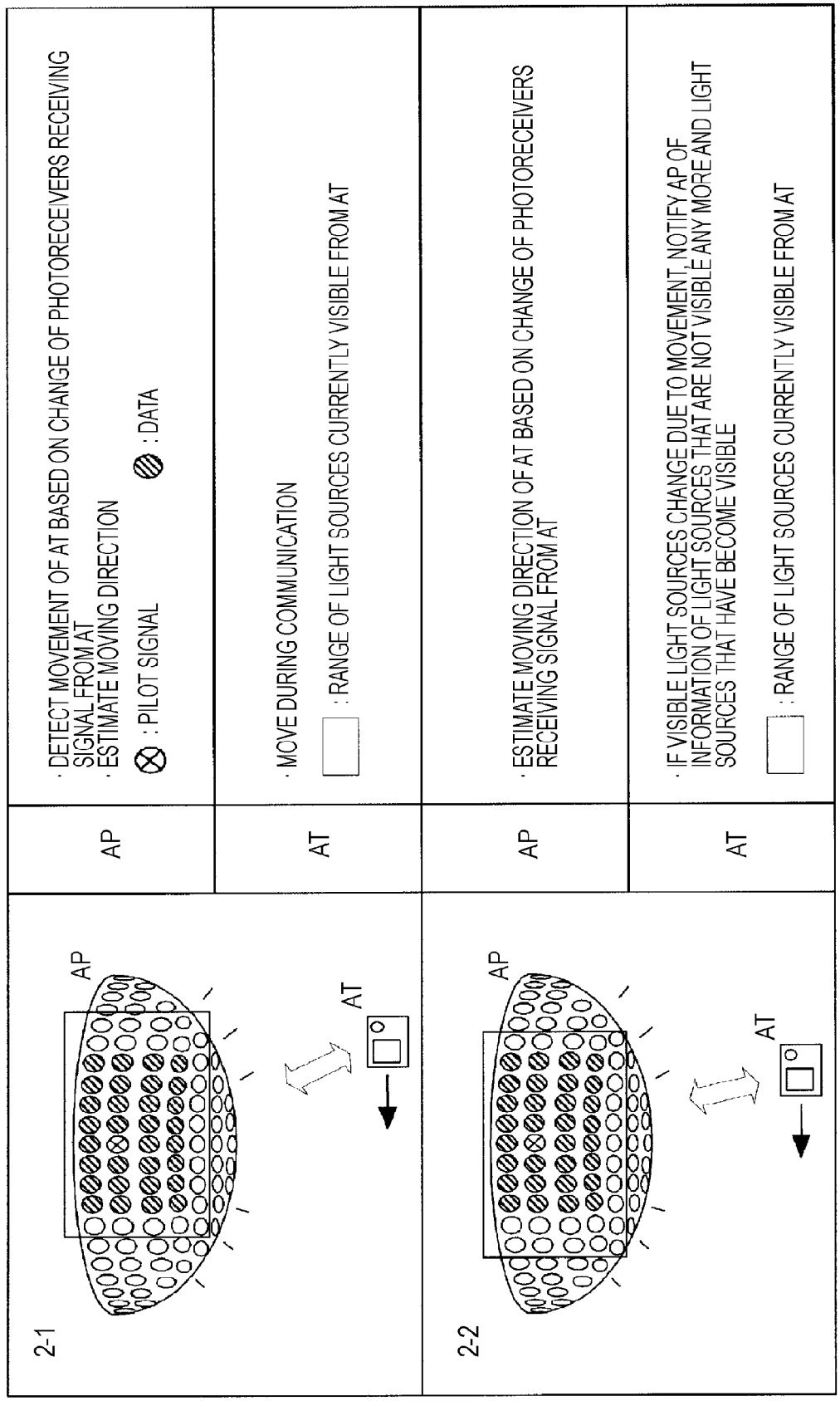
FIG. 16 illustrates a second example of measures taken in the communication system according to the second embodiment.
Figure 17:
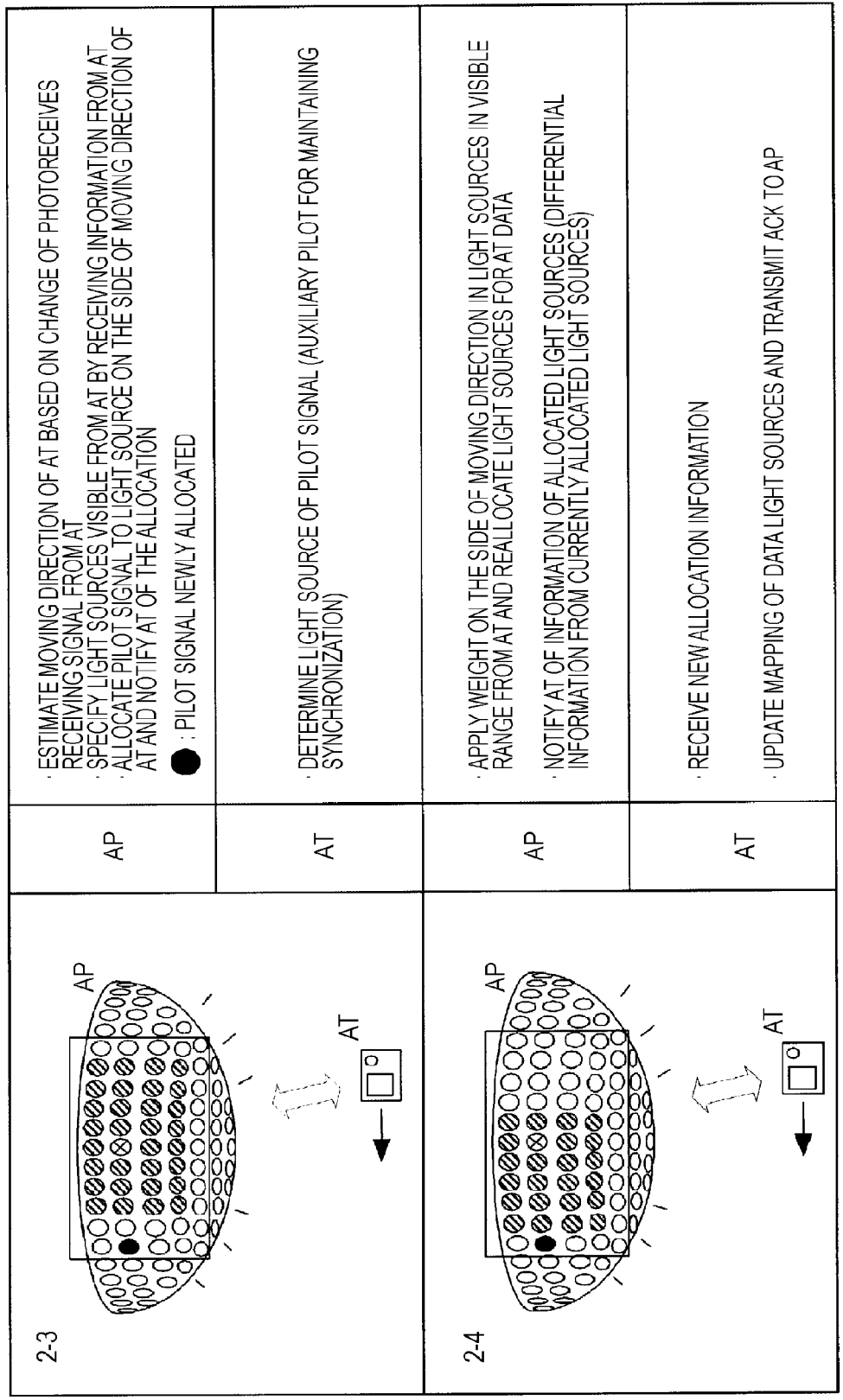
FIG. 17 illustrates a second example of measures taken in the communication system according to the second embodiment.
Figure 18:
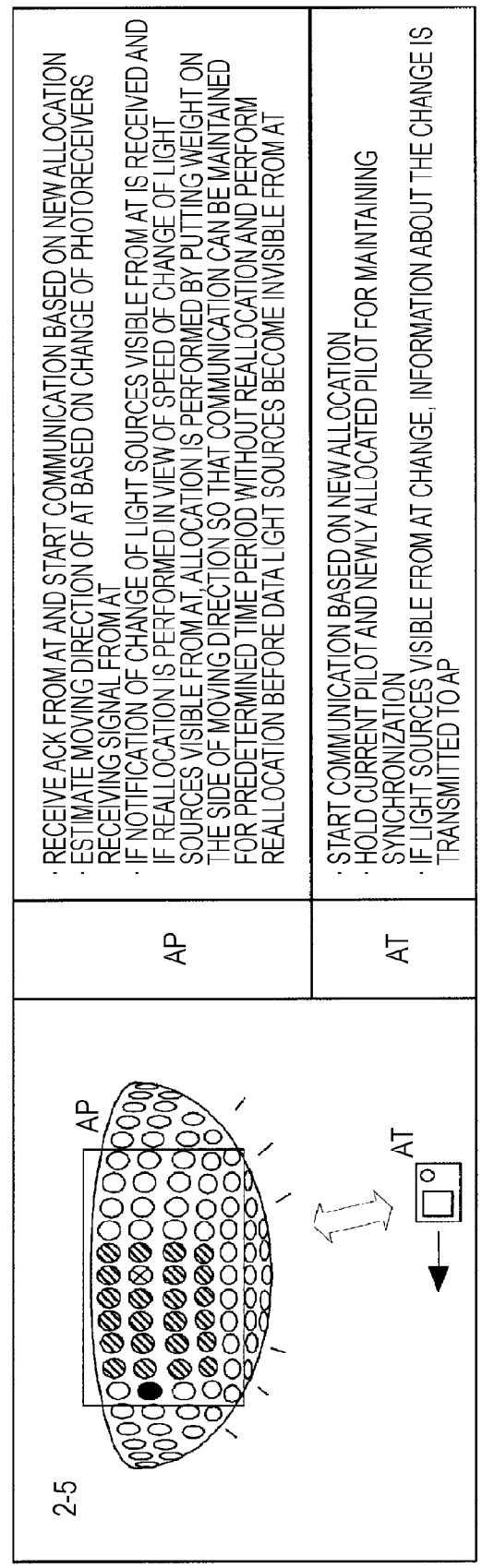
FIG. 18 illustrates a second example of measures taken in the communication system according to the second embodiment.

FIGS. 16 to 18 illustrate an embodiment of measures that are taken when the light sources 511 visible from the AT 600 change due to movement of the AT 600 during communication.

In 2-1 of FIG. 16, the position estimating unit 508 of the AP 500 detects movement of the AT 600 based on change of the photoreceivers 512 that can receive a signal from the AT 600. Also, the position estimating unit 508 estimates the moving direction of the AT 600 based on the change of the photoreceivers 512.

In 2-2 of FIG. 16, when the visible light sources 511 change due to movement of AT 600, the allocation analyzing unit 610 of the AT 600 notifies the AP 500 of coordinate information of the light sources 511 that are not visible any more and of the light sources 511 that have become visible (visible light source change information).

FIG. 19 illustrates an example of the visible light source change information. The visible light source change information includes the name of signal, a coordinate system, the number of light sources 511 that are not visible any more, the number of light sources 511 that have become visible, the coordinates of the light sources 511 that are not visible any more, and the coordinates of the light sources 511 that have become visible.

In 2-3 of FIG. 17, the position estimating unit 508 estimates the moving direction of the AT 600 based on change of the photoreceivers 512 receiving a signal from the AT 600 and specifies the light sources 511 that are visible in the AT 600 based on the visible light source change information from the AT 600. The allocation control unit 507 newly allocates a pilot signal to any of the light sources 511 in accordance with the moving direction of the AT 600. The new pilot signal is allocated in advance so that pilot synchronization can be maintained even if the pilot signal is lost due to significant movement of the AT 600. The allocation control unit 507 may allocate a plurality of pilot signals to the light sources 511 in a plurality of directions for a case that the moving direction of the AT 600 suddenly changes.

In 2-4 of FIG. 17, the position estimating unit 508 estimates the moving direction of the AT 600 based on change of the photoreceivers 512 receiving a signal from the AT 600. The allocation control unit 507 registers the visible light source change information from the AT 600 in the storage unit 506, applies a weight on the side of the moving direction of the AT 600, allocates the user data to the light sources 511 at the positions in accordance with the weighted moving direction, and notifies the AT 600 of information of the user data light sources 511 (allocated light source information). The allocation analyzing unit 610 of the AT 600 recognizes the user data light sources 511 to which the user data has been newly allocated based on the allocated light source information and transmits Ack (a packet message used in the Transmission Control Protocol to acknowledge receipt of a packet) to the AP 500.

In 2-5 of FIG. 18, the communication control unit 510 of the AP 500 receives the Ack (a packet message used in the Transmission Control Protocol to acknowledge receipt of a packet) from the AT 600 and starts communication of user data by using the new user data light sources 511. At the same time, the position estimating unit 508 estimates the moving direction of the AT 600 based on change of the photoreceivers 512 receiving a signal from the AT 600.

After that, when the AP 500 receives visible light source change information from the AT 600, the AP 500 may take a temporal change of the light sources 511 visible in the AT 600 into consideration instead of performing reallocation, so as to decrease frequency of reallocation. In that case, the allocation control unit 507 may further apply weight by speed on the side of the moving direction and may allocate the user data to the light sources 511 at the positions in accordance with the weighted moving direction so that the user data light sources 511 do not become invisible in the AT 600 for a predetermined time period. In that case, the AT 600 receives data from the user data light sources 511 to which user data is newly allocated and notifies the AP 500 of the visible light source change information as necessary.

In the above-described process, by performing reallocation of user data to the light sources 511 appropriately or as necessary when the AT 600 moves, communication can be maintained. Also, losing sight of the pilot signal causing breakdown of communication due to movement of the AT 600 can be prevented.

Figure 20:
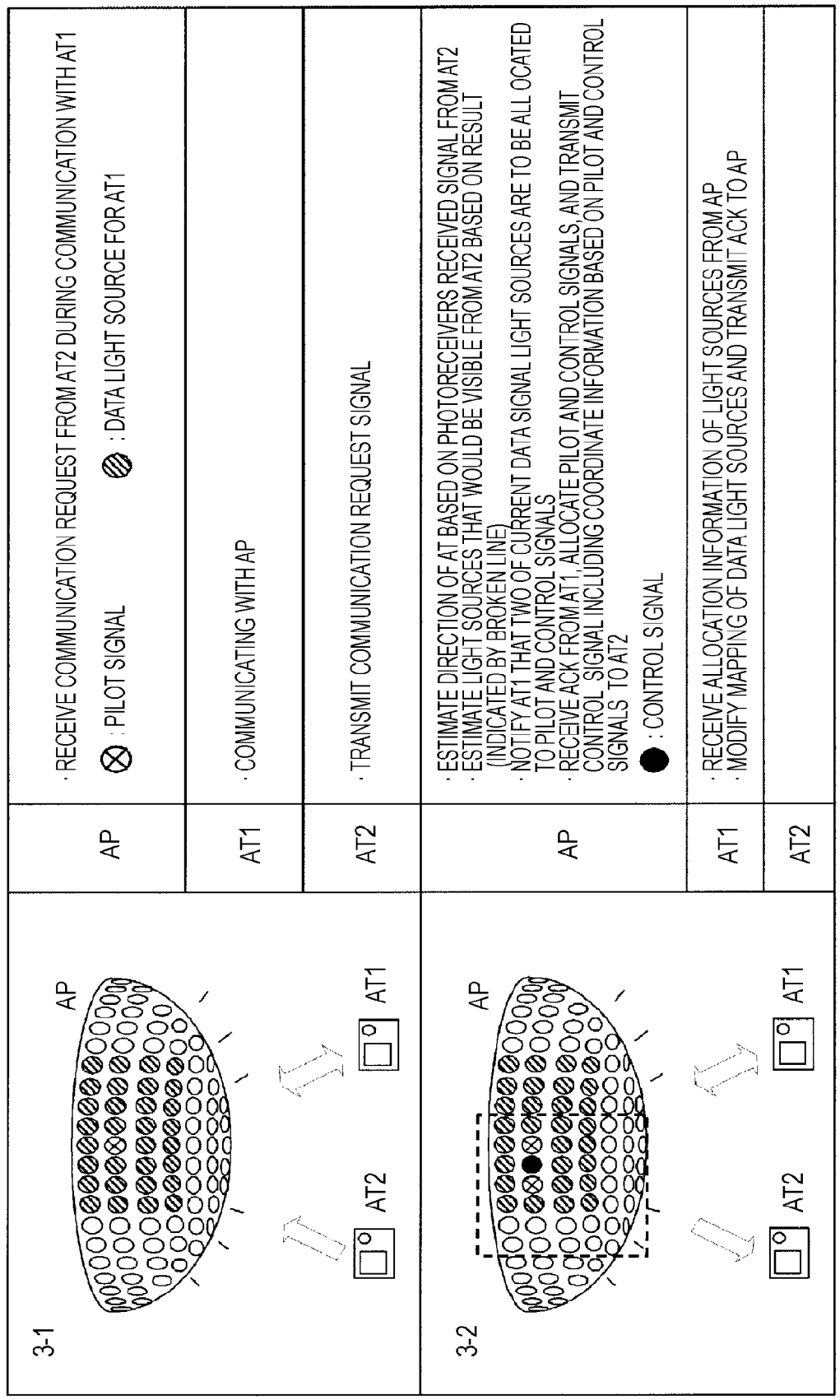
FIG. 20 illustrates a third example of measures taken in the communication system according to the second embodiment.
Figure 21:
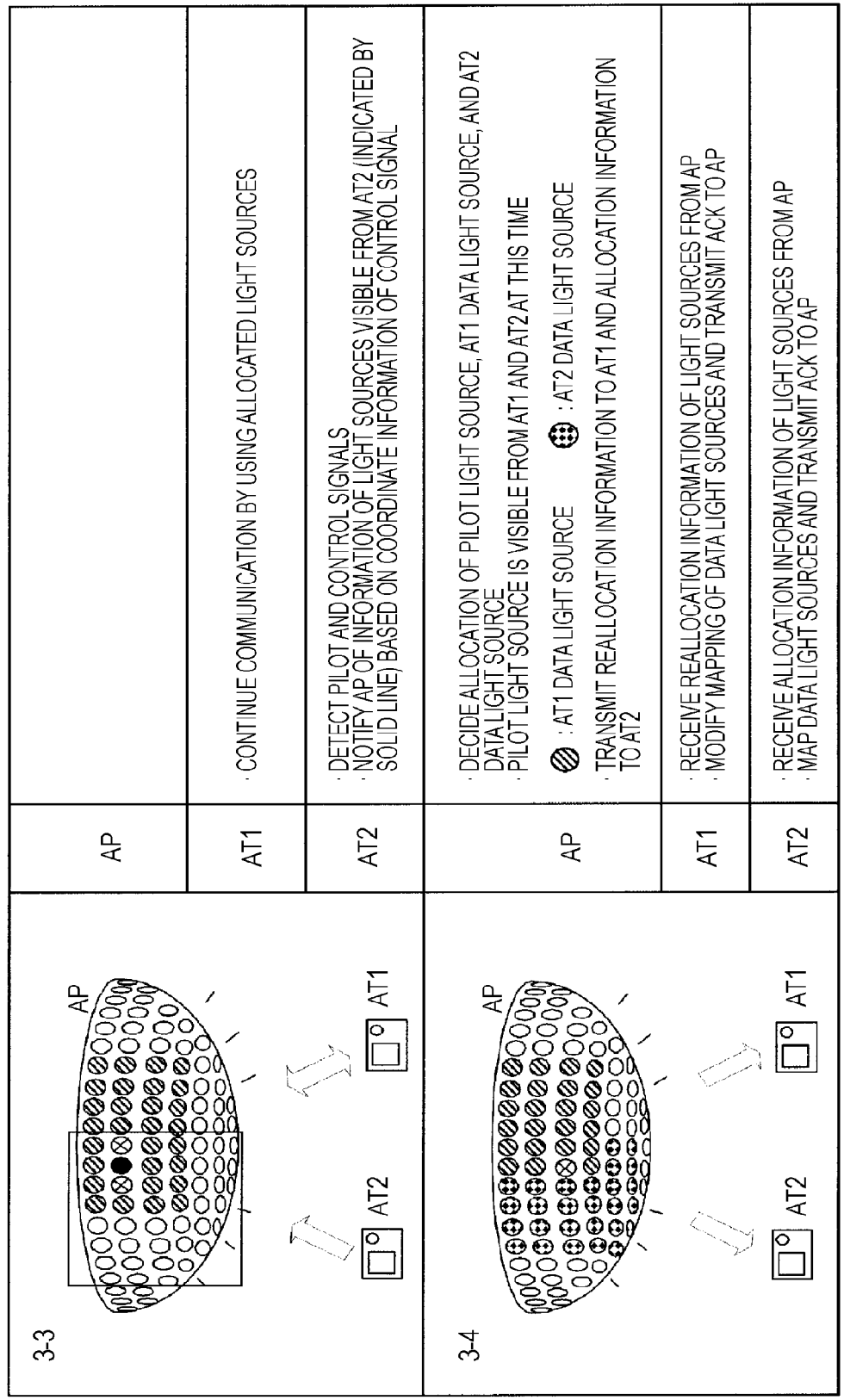
FIG. 21 illustrates a third example of measures taken in the communication system according to the second embodiment.
Figure 22:
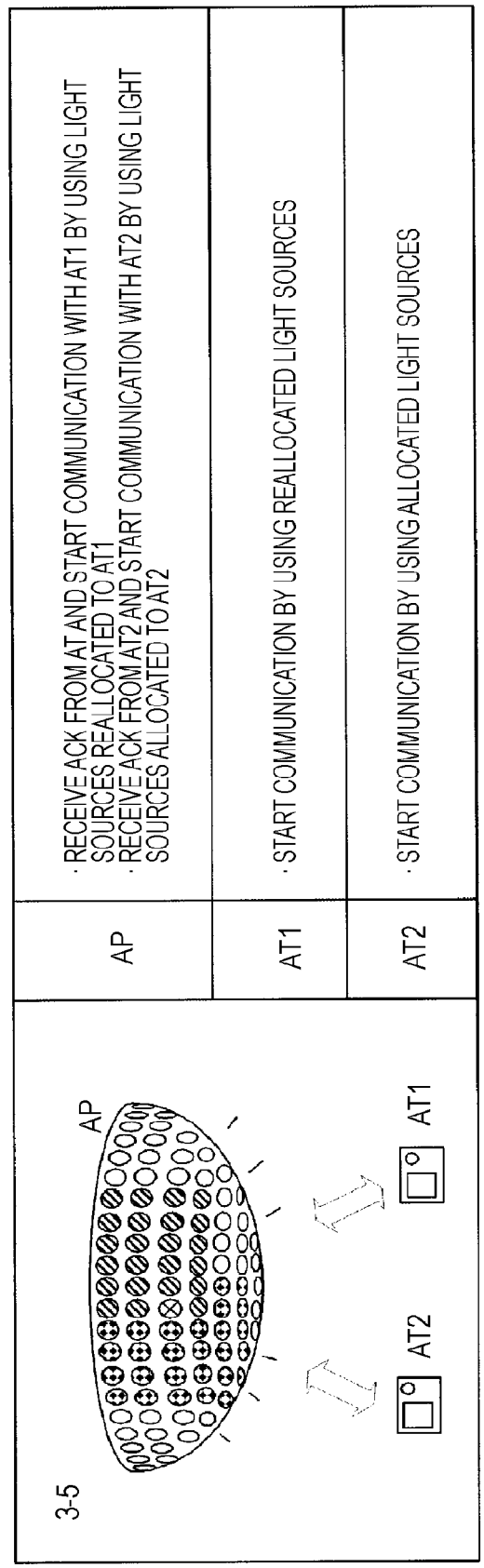
FIG. 22 illustrates a third example of measures taken in the communication system according to the second embodiment.

FIGS. 20 to 22 illustrate an embodiment of measures that are taken when a second AT 600 (hereinafter referred to as AT2) starts communication during communication between the AP 500 and the AT 600 (hereinafter referred to as AT1).

Assume a case where the AT2 transmits a communication request to the AP 500 while the AP 500 is communicating with the AT1. In that case, if the range of the light sources 511 visible from the AT2 does not overlap the range of the light sources 511 used in the communication with the AT1, there is no effect on the AT1, and thus the AP 500 allocates user data to the AT2 to the light sources 511 in accordance with the embodiment illustrated in FIGS. 10 to 12. On the other hand, if the both ranges overlap each other, the AT1 needs to be notified of that fact. Hereinafter, this case is described.

In 3-1 of FIG. 20, the AT2 transmits a communication request signal to the AP 500 during communication between the AP 500 and the AT1.

In 3-2 of FIG. 20, the AP 500 receives the communication request signal from the AT2, and then, the position estimating unit 508 assumes that the light sources 511 in the range surrounded by the photoreceivers 512 received the signal from the AT2 are visible in the AT2 and estimates the direction where the AT2 exists. Based on the estimation result, the allocation control unit 507 estimates the light sources 511 that are visible in the AT2. Then, if the allocation control unit 507 estimates that the pilot signal light source 511 that is currently used for the communication with the AT1 is visible in the AT2, the allocation control unit 507 decides to allocate two new pilot signals and a control signal to the light sources 511 for the communication with the AT1 and AT2. At this time, the light sources 511 to which the new pilot signals and the control signal are to be allocated operate as the user data light sources 511 for the communication with the AT1. The allocation control unit 507 transmits information of the allocated light sources 511 (allocated light source information) to the AT1.

The allocation analyzing unit 610 of the AT1 receives the allocated light source information, modifies information of the pilot signal light source 511, the control signal light source 511, and the user data light sources 511, and then transmits Ack (a packet message used in the Transmission Control Protocol to acknowledge receipt of a packet). The allocation control unit 507 receives the Ack (a packet message used in the Transmission Control Protocol to acknowledge receipt of a packet) from the AT1, actually allocates the two new pilot signals and the control signal to the light sources 511, and transmits the coordinate information illustrated in FIG. 11 to the AT2 by using the control signal light source.

In 3-3 of FIG. 21, the AT1 continues communication with the user data light sources 511. On the other hand, if the AT2 has received the two pilot signals and the control signal from the control signal light source 511 positioned at the midpoint between the two pilot signal light sources 511, which are transmission sources of the two pilot signals, the allocation analyzing unit 610 of the AT2 specifies the coordinates of the light sources 511 visible in the AT2 based on the coordinate information and transmits the specified coordinates as visible light source information to the AP 500.

In 3-4 of FIG. 21, the allocation control unit 507 of the AP 500 specifies the light sources 511 that are visible in both the AT1 and AT2 based on the visible light source information, allocates the user data for the AT1 and the user data for the AT2 to the light sources 511 different from each other, allocates a pilot signal to the light source 511 visible in both the AT1 and AT2, and notifies the AT1 and AT2 of the allocated light source information illustrated in FIG. 13. The allocation analyzing unit 610 of each of the AT1 and AT2 receives the allocated light source information from the AP 500, modifies the information of the pilot signal light source 511 and the user data light sources 511 and transmits Ack (a packet message used in the Transmission Control Protocol to acknowledge receipt of a packet) to the AP 500.

In 3-5 of FIG. 22, the communication control unit 510 of the AP 500 receives Ack (a packet message used in the Transmission Control Protocol to acknowledge receipt of a packet) from the AT1 and AT2, and then performs communication with the AT1 and AT2 by using the newly allocated light sources 511.

In the above-described process, even if the AT2 requests communication while the AT1 is performing communication, the AP 500 can perform communication with both the AT1 and AT2 without stopping the communication with the AT1. Also, by allowing the AT1 and AT2 to share the pilot signal light source 511, a decrease in user data light sources 511 can be suppressed and the light sources 511 can be effectively used. In 3-2 of FIG. 16, two new pilot signals and a control signal are allocated to part of the user data light sources 511 used for communication with the AT1. Alternatively, the AT 500 may allocate the two new pilot signals and the control signal to the light sources 511 that are not used for communication with the AT1, notify the AT2 of coordinate information, and allow the AT2 to use the same pilot signal light source 511 as that of the AT1 when the AT2 starts communication, so as to reduce the number of changes of allocation to the AT1.

Figure 23:
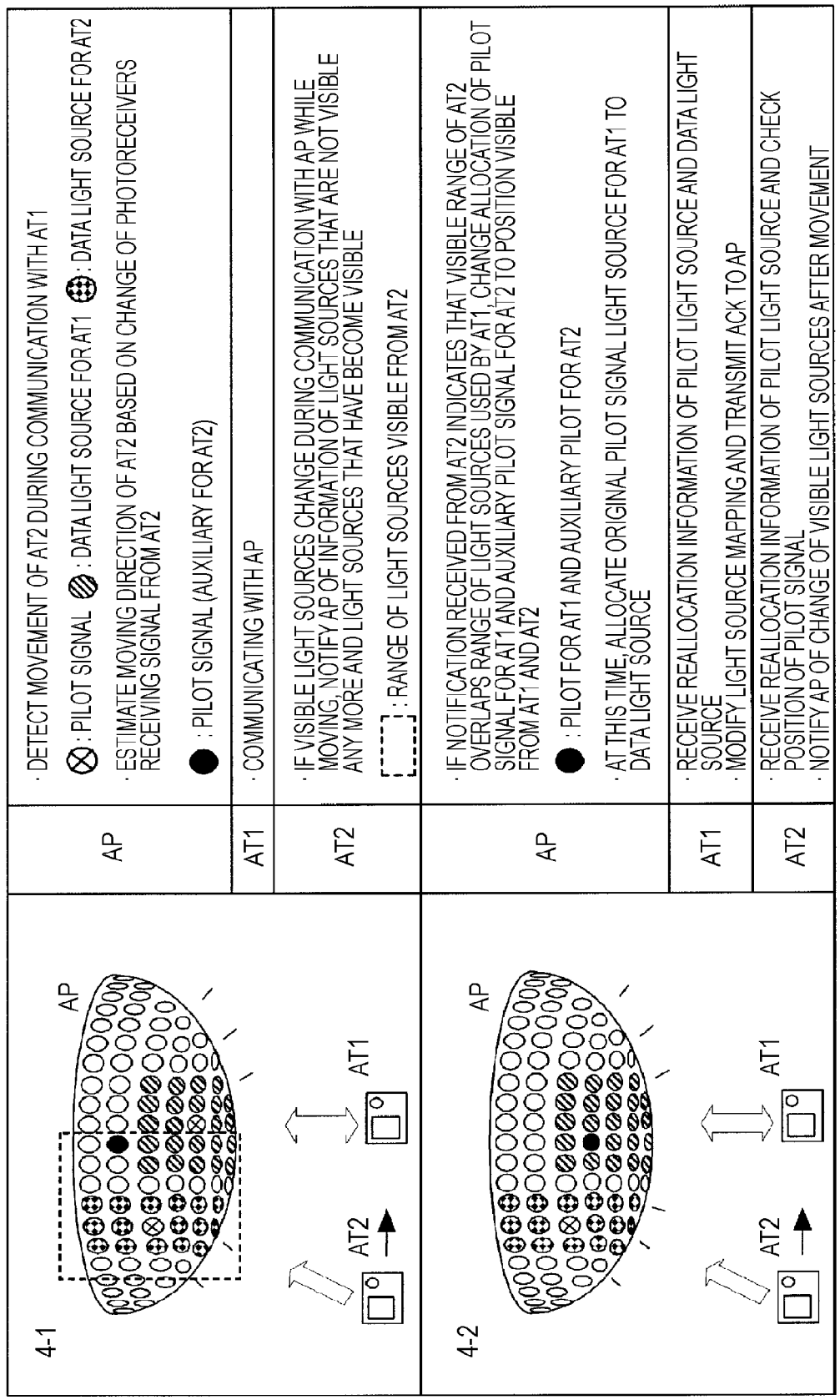
FIG. 23 illustrates a fourth example of measures taken in the communication system according to the second embodiment.
Figure 25:
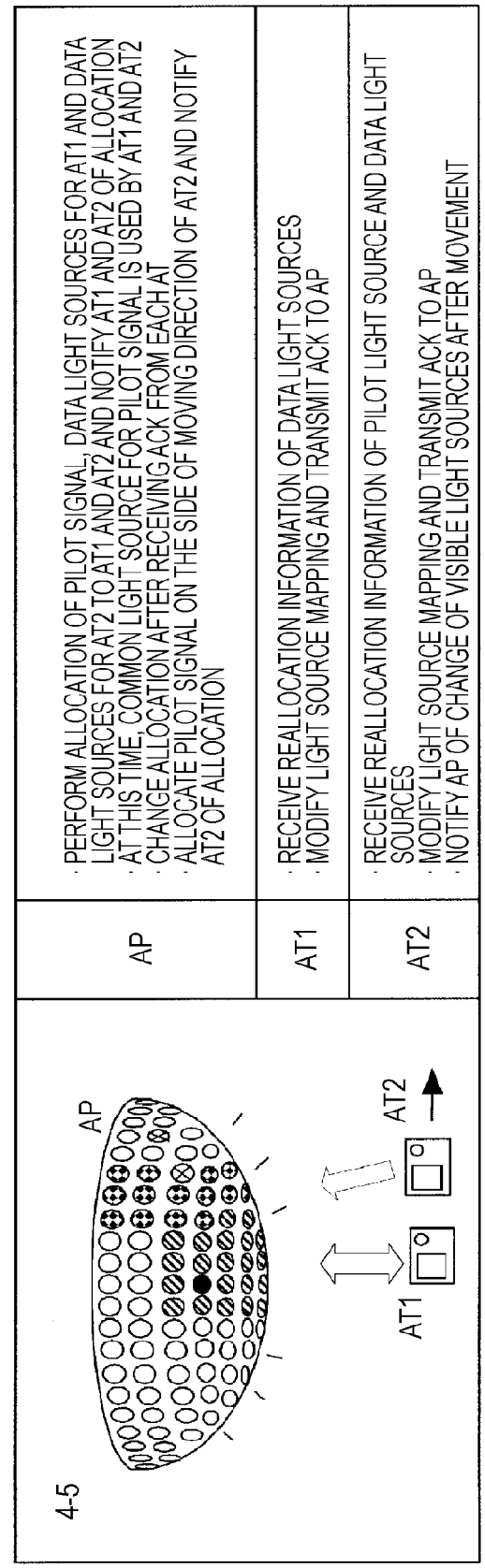
FIG. 25 illustrates a fourth example of measures taken in the communication system according to the second embodiment.

FIGS. 23 to 25 illustrate an embodiment of measures that are taken when the light sources 511 used for communication with the AT1 overlap the light sources 511 used for communication with the AT2 due to movement of the AT2 while the AP 500 is communicating with the AT1 and AT2.

If the AT2 moves while the AP 500 is communicating with the AT1 and AT2 and if the range of the light sources 511 visible in the AT2 does not overlap the range of the light sources 511 that are used for communication with the AT1, the AT1 is not affected and thus the AP 500 may allocate the user data for the AT2 to the light sources 511 in accordance with the embodiment illustrated in FIGS. 16 to 18. However, if the both ranges overlap each other, the AP 500 needs to notify the AT1 of that fact. This case is described below.

In 4-1 of FIG. 23, the AP 500 detects movement of the AT2 based on change of the photoreceivers 512 received a signal from the AT2 during communication with the AT1 and AT2.

The position estimating unit 508 of the AP 500 estimates the moving direction of the AT2 based on the change of the photoreceivers 512 receiving the signal from the AT2. If the light sources 511 visible in the AT2 change due to the movement of the AT2, the allocation analyzing unit 610 of the AT2 notifies the AP 500 of the visible light source change information illustrated in FIG. 14.

In 4-2 of FIG. 23, the AP 500 receives the visible light source change information from the AT2. The position estimating unit 508 estimates the moving direction of the AT2 based on the change of the photoreceivers 512 receiving a signal from the AT2 and detects a temporal change of the light sources 511 visible in the AT2. Furthermore, if it is determined that the range of the light sources 511 visible in the AT2 overlaps the range of the light sources 511 visible in the AT1 and if the light sources 511 visible in the AT2 actually overlap the light sources 511 that are being used in communication with the AT1, the allocation control unit 507 allocates the pilot signal for the AT1 to the light source 511 visible from both the AT1 and AT2 and also allocates an auxiliary pilot signal for the AT2 to the light source 511 that is visible from both the AT1 and AT2 and that is at the position according to the moving direction of the AT2, and notifies the AT1 and AT2 of allocated light source information.

The allocation analyzing unit 610 of the AT1 receives the allocated light source information, modifies information of the pilot signal light source 511, the control signal light source 511, and the user data light sources 511, and then transmits Ack (a packet message used in the Transmission Control Protocol to acknowledge receipt of a packet). On the other hand, the allocation analyzing unit 610 of the AT2 receives the allocated light source information and checks the position of the light source 511 to which the auxiliary pilot signal has been allocated. If the visible light sources 511 change, the allocation analyzing unit 610 notifies the AP 500 of the visible light source change information illustrated in FIG. 14.

In 4-3 of FIG. 24, the allocation control unit 507 of the AP 500 decides to allocate the pilot signal, the user data for the AT1, and the user data for the AT2 to the light sources 511, and notifies the AT1 and AT2 of the information of the light sources 511 (allocated light source information). At this time, if the range of the light sources 511 visible in the AT1 overlaps the range of the light sources 511 visible in the AT2, the allocation control unit 507 allocates a pilot signal common to the AT1 and AT2 to one of the light sources 511 in the overlapped range.

The allocation analyzing unit 610 of the AT1 and AT2 receives the allocated light source information, modifies the information of the pilot signal light source 511 and the user data light sources 511, and transmits Ack (a packet message used in the Transmission Control Protocol to acknowledge receipt of a packet) to the AP 500. Furthermore, if the visible light sources 511 change, the allocation analyzing unit 610 of the AT2 notifies the AP 500 of the visible light source change information illustrated in FIG. 14. The communication control unit 510 of the AP 500 receives Ack (a packet message used in the Transmission Control Protocol to acknowledge receipt of a packet) from the AT1 and AT2 and then actually allocates the pilot signal, the user data for the AT1, and the user data for the AT2 to the light sources 511.

In 4-4 of FIG. 24, the AT2 moves further. If the light sources 511 visible in the AT2 change, the allocation control unit 507 of the AP 500 allocates the pilot signal, the user data for the AT1, and the user data for the AT2 to the light sources 511 and notifies the AT1 and AT2 of information of the light sources 511 (allocated light source information). At this time, the allocation control unit 507 allocates an auxiliary pilot signal for the AT2 to the light source 511 at the position according to the moving direction of the AT2.

The allocation analyzing unit 610 of the AT1 and AT2 receives the allocated light source information, modifies the information of the pilot signal light source 511 and the user data light sources 511, and transmits Ack (a packet message used in the Transmission Control Protocol to acknowledge receipt of a packet) to the AP 500. Furthermore, the allocation analyzing unit 610 of the AT2 checks the position of the light source 511 to which the auxiliary pilot signal has been allocated. If the visible light sources 511 change, the allocation analyzing unit 610 notifies the AP 500 of the visible light source change information illustrated in FIG. 14.

In 4-5 of FIG. 25, if the light sources 511 visible in the AT2 change due to further movement of the AT2, the allocation control unit 507 of the AP 500 allocates the pilot signal for the AT1, the pilot signal for the AT2, the user data for the AT1, and the user data for the AT2 to the light sources 511, and notifies the AT1 and AT2 of information of the light sources 511 (allocated light source information). At this time, the allocation control unit 507 allocates the pilot signal for the AT2 to the light source 511 to which the auxiliary pilot signal is allocated in the above-described 4-4. Accordingly, the AT can prevent losing sight of the pilot signal. The allocation analyzing unit 610 of the AT1 and AT2 receives the allocation light source information, modifies information of the pilot signal light source 511 and the user data light sources 511, and transmits Ack (a packet message used in the Transmission Control Protocol to acknowledge receipt of a packet) to the AP 500. Furthermore, the allocation analyzing unit 610 of the AT2 checks the position of the light source 511 to which the pilot signal for the AT2 is allocated. If the visible light sources 511 change, the allocation analyzing unit 610 notifies the AP 500 of the visible light source change information illustrated in FIG. 14.

In the above-described process, during communication between the AP 500 and the AT1 and AT2, even if the light sources 511 used for communication with the AT1 overlap the light sources 511 used for communication with the AT2 due to movement of the AT2, the AP 500 can continue communication with both the AT1 and AT2 without stopping the communication with the AT1. Also, the number of user data light sources 511 does not reduce by using the pilot signal light source 511 common to the AT1 and AT2, and thus the light sources 511 can be effectively used. Furthermore, as in the embodiment illustrated in FIG. 16, the allocation control unit 507 puts a weight by speed on the side of the moving direction of the AT2, so that the frequency of reallocation can be reduced and load on the AT1 can be reduced.

INDUSTRIAL APPLICABILITY

As described above, the transmitter apparatus and the communication system according to the present invention enable free arrangement of light sources and are useful as a transmitter apparatus and a communication system.

It is needless to say that the present invention is not limited to the foregoing embodiments. It is therefore understood that numerous modifications and variations can be devised by those skilled in the art without departing from the scope of the appended claims. Accordingly, such modifications and variations are, unless they depart from the scope of the present invention as delivered from the claims appended hereto, to be construed as included therein.

The invention claimed is:

1. A transmitter apparatus to transmit information to a receiver apparatus by using visible light emitted from a plurality of light sources, the transmitter apparatus comprising:
    at least a first light source to transmit user data;
    at least a second light source to transmit a first signal; and
    at least a third light source to transmit notice information that is necessary for receiving the user data in the receiver apparatus, the third light source being placed at a position determined by the position of the second light source, wherein
    the first signal is the signal that is necessary for specifying the third light source in receiver apparatus.

2. The transmitter apparatus according to claim 1, wherein the notice information includes information that is necessary for specifying the first light source in the receiver apparatus.

3. The transmitter apparatus according to claim 2, wherein the notice information includes information of positions of the second and third light sources.

4. The transmitter apparatus according to claim 1, wherein the notice information includes information about a communication method for transmitting the user data.

5. The transmitter apparatus according to claim 1, further comprising a selecting section for selecting the first light source used for transmitting the user data to the receiver apparatus from among the plurality of light sources.

6. The transmitter apparatus according to claim 5, wherein the selecting section selects the first light source when receiving a communication request from the receiver apparatus.

7. The transmitter apparatus according to claim 5, wherein, if a reception error of the user data from the receiver apparatus is received once or a plurality of times, the selecting section selects a light source other than the first light source that has transmitted the user data received in error, the selected light source being regarded as a new first light source.

8. The transmitter apparatus according to claim 5, further comprising an estimating section for estimating light sources visible in the receiver apparatus, wherein the selecting section selects the first light source from among the light sources that are estimated by the estimating section to be visible in the receiver apparatus.

9. The transmitter apparatus according to claim 8, wherein the estimating section estimates the light sources visible in the receiver apparatus based on a direction where the receiver apparatus exists.

10. The transmitter apparatus according to claim 9, further comprising a plurality of receiving elements, wherein the estimating section estimates the direction where the receiver apparatus exists based on a time difference of receiving information from the receiver apparatus in the plurality of receiving elements.

11. The transmitter apparatus according to claim 8, further comprising a plurality of receiving elements placed around the light sources, wherein the estimating section estimates that the light sources placed in a range surrounded by the receiving elements received information from the receiver apparatus are visible in the receiving apparatus.

12. The transmitter apparatus according to claim 5, wherein the selecting section selects the first light source from among the light sources visible in the receiver apparatus based on information about the light sources visible in the receiver apparatus from the receiver apparatus.

13. The transmitter apparatus according to claim 8, wherein the selecting section selects the first light source from among the light sources visible in the receiver apparatus in accordance with a temporal change of the light sources visible in the receiver apparatus.

14. The transmitter apparatus according to claim 13, wherein the selecting section comprises a plurality of selecting sections, which select the first light source from among the light sources that can become visible in the receiver apparatus within predetermined time.

15. The transmitter apparatus according to claim 8, wherein the selecting section comprises a plurality of selecting sections, which select the second and third light sources from among the light sources that are visible in any of a plurality of receiver apparatuses.

16. The transmitter apparatus according to claim 1, wherein the plurality of light sources constitute an illuminating device.

17. A communication system comprising the transmitter apparatus according to claim 1 and a receiver apparatus including receiving section for receiving information from the transmitter apparatus through visible light, wherein the receiving section specifies the third light source based on the first signal from the second light source and specifies the first light source based on notice information from the third light source so as to receive user data from the first light source.

18. The communication system according to claim 17, wherein the receiving section includes:
light collecting section for collecting visible light from the transmitter apparatus; and
a plurality of photoreceivers for receiving the visible light collected by the light collecting section.

19. The communication system according to claim 18, wherein the receiving section includes:
light collecting section for collecting visible light from the transmitter apparatus; and
a plurality of photoreceivers for receiving the visible light collected by the light collecting section.

20. The transmitter apparatus according to claim 1, wherein the second light source transmits the first signal as a pilot signal.

21. The transmitter apparatus according to claim 1, wherein the second light source comprises more than two light sources, and the third light is surrounded by the second light source.

22. The transmitter apparatus according to claim 1, wherein the second light source comprises more than two light sources, the transmitter apparatus including a square with four corners, and the third light is located on the center of the square of the transmitter apparatus, the corners of the square defined by the second light.

* * * * *